(12) United States Patent
Ishibashi et al.

(10) Patent No.: US 7,310,731 B2
(45) Date of Patent: Dec. 18, 2007

(54) CONTENTS PROCESSING SYSTEM

(75) Inventors: Yoshihito Ishibashi, Tokyo (JP); Tateo Oishi, Saitama (JP); Tomoyuki Asano, Kanagawa (JP); Yoshitomo Osawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 149 days.

(21) Appl. No.: 10/897,684

(22) Filed: Jul. 23, 2004

(65) Prior Publication Data
US 2005/0005148 A1   Jan. 6, 2005

Related U.S. Application Data

(63) Continuation of application No. 09/509,583, filed on Mar. 28, 2000, now Pat. No. 6,834,346.

(51) Int. Cl.
*H04K 1/00* (2006.01)
*H04L 9/00* (2006.01)
*G06Q 30/00* (2006.01)

(52) U.S. Cl. .................. 713/170; 705/51; 713/179
(58) Field of Classification Search .................. 705/51; 713/170, 179
See application file for complete search history.

(56) References Cited

U.S. PATENT DOCUMENTS

| | | | |
|---|---|---|---|
| 5,247,575 A | 9/1993 | Sprague et al. | 705/53 |
| 5,319,705 A | 6/1994 | Halter et al. | 705/54 |
| 5,341,429 A * | 8/1994 | Stringer et al. | 705/52 |
| 5,394,469 A * | 2/1995 | Nagel et al. | 705/53 |
| 5,400,403 A | 3/1995 | Fahn et al. | 705/51 |
| 5,592,549 A * | 1/1997 | Nagel et al. | 705/52 |
| 5,606,609 A * | 2/1997 | Houser et al. | 713/179 |
| 5,742,677 A * | 4/1998 | Pinder et al. | 705/52 |
| 5,764,769 A | 6/1998 | Bennett et al. | 713/176 |
| 5,765,152 A * | 6/1998 | Erickson | 707/9 |
| 5,832,515 A | 11/1998 | Ledain et al. | 707/202 |
| 5,835,595 A * | 11/1998 | Fraser et al. | 713/169 |
| 5,892,900 A * | 4/1999 | Ginter et al. | 726/26 |
| 5,940,507 A * | 8/1999 | Cane et al. | 713/165 |
| 5,991,402 A | 11/1999 | Jia et al. | 705/59 |
| 6,161,183 A | 12/2000 | Saito et al. | 713/176 |
| 6,834,346 B1 * | 12/2004 | Ishibashi et al. | 713/179 |

FOREIGN PATENT DOCUMENTS

| | | |
|---|---|---|
| JP | 9-191394 | 7/1997 |
| JP | 10-133955 | 5/1998 |
| JP | 10-145757 | 5/1998 |
| JP | 10-155151 | 6/1998 |
| JP | 10-191036 | 7/1998 |

* cited by examiner

*Primary Examiner*—Matthew Heneghan
(74) *Attorney, Agent, or Firm*—Finnegan, Henderson, Farabow, Garrett, Dunner, L.L.P.

(57) ABSTRACT

A first information processing unit stores identification information into a storage module, stores an encrypted contents signal into a mass storage unit, and supplies the encrypted contents signal and identification information to a second information processing unit through a communication section. In a receiving unit of the first information processing unit, log information generated by a purchase processing module is stored into the storage module every time the contents key is decoded, and the log information is transmitted at predetermined timing to a key management center through the transmission section. The second information processing unit receives the encrypted contents signal and the identification information through a communication section, and causes a contents processing section to decode the encrypted contents signal and to append the identification information thereto.

10 Claims, 15 Drawing Sheets

CONTENTS PROCESSING SYSTEM

This is a Continuation of Application Ser. No. 09/509,583 filed Mar. 28, 2000 now U.S. Pat. No. 6,834,346.

TECHNICAL FIELD

This invention relates to a contents processing system for a user to obtain encrypted contents data through electronic distribution.

BACKGROUND ART

Recently, there has been data distribution for providing encrypted contents data to a user through electronic distribution using satellite broadcast or the Internet.

In the electronic distribution using satellite broadcast or the Internet, encrypted data is transmitted and received between a data transmission device and a receiving device in order to prevent leakage of the data to a third party. The contents to be electronically distributed include music, images, and works such as programs and texts.

With respect to the contents data such as music and images on which the copyright has been established, free duplication of such contents data even for the personal use may violate the copyright protection. Particularly, duplication of digital data, or so-called digital copy or digital dubbing, enables duplication of contents data without suffering deterioration of signals. Therefore, there need be some restrictions. For example, the audio digital interface prescribed by the IEC958 employs a copy generation restriction system called SCMS (serial copy management system) used in the existing CD (compact disc), DAT (digital audio tape) or MD (mini disc). This system is adapted for describing a copy control code to bits on the digital interface for prohibiting copy of the second and subsequent generations in executing copy for the first time (first generation) to a predetermined recording medium. Specifically, in the SCMS, the SCMS copy control code appended to or embedded in the "parent" contents data permits one-generation copy, and the SCMS copy control code is rewritten to prohibit copy with respect to the "child" contents data, which is obtained by sending and digitally duplicating the parent contents data at a duplication destination.

In the case where the service of contents data such as music data is provided through electronic distribution using the Internet or satellite broadcast, in general, the contents data such as music data is encrypted and a key (contents key) used for the encryption is also encrypted by another key (distribution key).

Meanwhile, in the case where one-generation digital duplication of the contents data such as music data can be carried out as in the conventional cases, the copy control code of the "parent" contents data permits one-generation copy, and the copy control code of the "child" contents data in the equipment at the duplication destination must be rewritten to prohibit copy.

In the case where the "parent" contents data are encrypted, if the equipment at the duplication destination has a function to decode the encrypted data, sending the contents data to the equipment at the duplication destination without decoding is preferred in view of the processing time and labor. However, since the SCMS copy control code embedded in the contents data and thus encrypted together with the contents data, the copy control code embedded and encrypted in the contents data is supplied to the equipment at the duplication destination without having its value changed. On the other hand, if the copy control code is to be rewritten to prohibit copy by the equipment on the supply side, then embedded in the contents data and sent to the equipment at the duplication destination, the contents data must be decrypted to rewrite the copy control code to prohibit copy and the contents data then must be encrypted again. The processing is complicated troublesome.

In general, the size of the contents key is approximately several bytes and the size of the contents data is several hundred kbytes to several Mbytes or even several Gbytes. Therefore, resetting the key takes a very long processing time.

DISCLOSURE OF THE INVENTION

In view of the foregoing status of the art, it is an object of the present invention to provide a contents signal receiving device and a contents processing system which enable efficient embedding of identification information of an equipment used in obtaining contents signals into the contents, when a user obtains encrypted contents signals through electronic distribution and then decodes and outputs contents.

It is another object of the present invention to provide a contents processing device, an encryption processing device and a contents processing system which enable secure accounting when a user obtains and decodes encrypted contents signals through electronic distribution.

It is still another object of the present invention to provide a contents signal receiving method which enables efficient embedding of identification information of an equipment used in obtaining contents signals into the contents, when a user obtains encrypted contents signals through electronic distribution and then decodes and outputs contents.

It is still another object of the present invention to provide a contents processing method which enables secure accounting when a user obtains and decodes encrypted contents signals through electronic distribution.

A contents signal receiving device according to the present invention includes: receiving means for receiving an encrypted contents signal; storage means for storing the encrypted contents signal received by the receiving means; decoding means for decoding the encrypted contents signal stored in the storage means when an instruction to decode the encrypted contents signal stored in the storage means is given as user-designated information; and identification information appending means for appending identification information to the contents signal decoded by the decoding means.

Also, a contents signal receiving device according to the present invention includes: receiving means for receiving an encrypted contents signal and identification information from an external device; decoding means for decoding the encrypted contents signal; and identification information appending means for appending identification information to the contents signal decoded by the decoding means.

Also, a contents processing device according to the present invention includes: decoding means for decoding an encrypted contents signal using a contents key; log information generation means for generating log information every time the contents key is decoded by the decoding means; storage means for storing the log information; and transmission means for transmitting the log information at predetermined timing.

Also, a contents processing device according to the present invention includes: receiving means for receiving an encrypted contents key obtained by encrypting a contents key for decoding an encrypted contents signal by using a distribution key updated every predetermined period; decoding means for decoding the encrypted contents signal by the contents key; accounting information generation means for generating accounting information concerning the use of the encrypted contents signal; storage means for storing the accounting information; and transmission means for transmitting the accounting information when the distribution key is updated.

Also, a contents processing device according to the present-invention includes: receiving means for receiving a distribution key, which is a key for decoding an encrypted contents signal and is updated every predetermined period; decoding means for decoding the encrypted contents signal on the basis of the distribution key; accounting information generation means for generating accounting information concerning the use of the encrypted contents signal; storage means for storing the accounting information; and transmission means for transmitting the accounting information when the distribution key is updated.

Also, an encryption processing device according to the present invention includes: decoding means for decoding an encrypted contents key obtained by encrypting a contents key for decoding a contents signal; log information generation means for generating log information every time the contents key is decoded; encryption means for encrypting the contents key by a save key; and a one-chip module internally storing the decoding means, the log information generation means and the encryption means.

Also, a contents processing system according to the present invention includes: a first contents processing device including storage means for storing an encrypted contents signal, storage means for storing identification information, and transmission means for transmitting the encrypted contents signal and the identification information; and a second contents processing device including receiving means for receiving the encrypted contents signal and the identification information, decoding means for decoding the encrypted contents signal, and identification information appending means for appending the identification information to the contents signal decoded by the decoding means.

Moreover, a contents processing system according to the present invention includes: a contents processing device including decoding means for decoding an encrypted contents signal by a contents key, log information generation means for generating log information every time the contents key is decoded by the decoding means, storage means for storing the log information, and transmission means for transmitting the log information at predetermined timing; and an accounting device including receiving means for receiving the log information, and accounting means for carrying out accounting based on the log information.

Also, a contents signal receiving method according to the present invention includes the steps of: receiving an encrypted contents signal; storing the received encrypted contents signal; decoding the stored encrypted contents signal when an instruction to decode the stored encrypted contents signal is given as user-designated information; and appending identification information to the decoded contents signal.

Furthermore, a contents signal receiving method according to the present invention includes the steps of: receiving an encrypted contents signal and identification information from outside; decoding the encrypted contents signal; and appending identification information to the decoded contents signal.

Also, a contents processing method according to the present invention includes the steps of: decoding an encrypted contents signal using a contents key; generating log information every time the contents key is decoded; storing the log information; and transmitting the log information at predetermined timing.

Also, a contents processing method according to the present invention includes the steps of: receiving an encrypted contents key obtained by encrypting a contents key for decoding an encrypted contents signal by using a distribution key updated every predetermined period; decoding the encrypted contents signal by the contents key; generating accounting information concerning the use of the encrypted contents signal; storing the accounting information; and transmitting the accounting information when the distribution key is updated.

Also, a contents processing method according to the present invention includes the steps of: receiving a distribution key, which is a key for decoding an encrypted contents signal and is updated every predetermined period; decoding the encrypted contents signal on the basis of the distribution key; generating accounting information concerning the use of the encrypted contents signal; storing the accounting information; and transmitting the accounting information when the distribution key is updated.

BEST MODE FOR CARRYING OUT THE INVENTION

Preferred embodiments of the present invention will now be described in detail with reference to the drawings.

Figure 1:
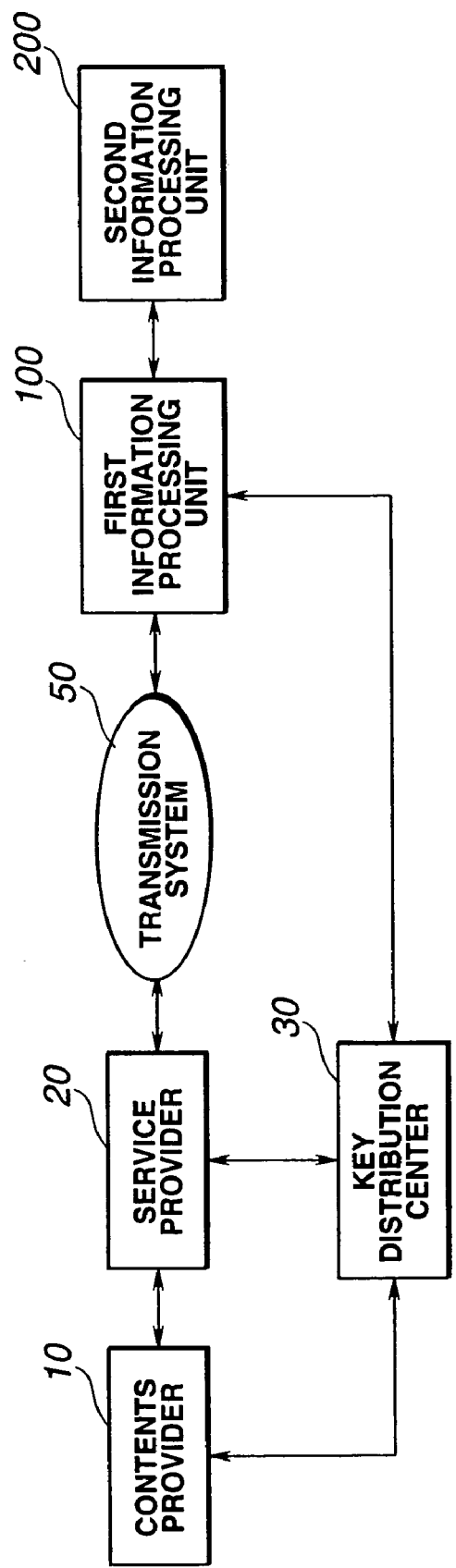
FIG. 1 is a block diagram showing the basic structure of an entire contents distribution system to which the present invention is applied.

FIG. 1 is a block diagram showing the basic structure of an entire contents distribution system to which the present invention is applied. The contents distribution system shown in FIG. 1 includes a contents provider 10 for holding contents data such as music data, dynamic image data, text data such as books, and static data, a service provider 20 for supplying contents data from the contents provider 10 to a user, a key distribution center 30 for distributing a key (distribution key) for distribution of contents, a transmission system 50 such as a satellite, a cable or the Internet for transmitting the contents data, a first information processing unit 100 on the user side, and a second information processing unit 200 to which the contents data is transferred from the first information processing unit 100.

The contents provider 10 holds the contents data, inserts a watermark to the contents data if necessary, and carries out compression and encryption of the contents data. The contents provider 10 also encrypts a contents key for decoding the encrypted contents data by using the distribution key. The contents provider 10 might separately have meta data in addition to the contents data. These data are sent to the service provider 20.

The service provider 20 receives the encrypted contents data and the encrypted contents key from the contents provider 10, determines the price of the contents data, establishes a communication channel, and transmits the encrypted data to the first information processing unit 100 on the user side through the transmission system 50.

The key distribution center 30 distributes the distribution key to the contents provider 10, obtains accounting information from the information processing unit 100 on the user side so as to carry out settlement processing, and carries out profit allotment to the contents provider 10 and the service provider 20 in accordance with the result of settlement processing.

Figure 2:
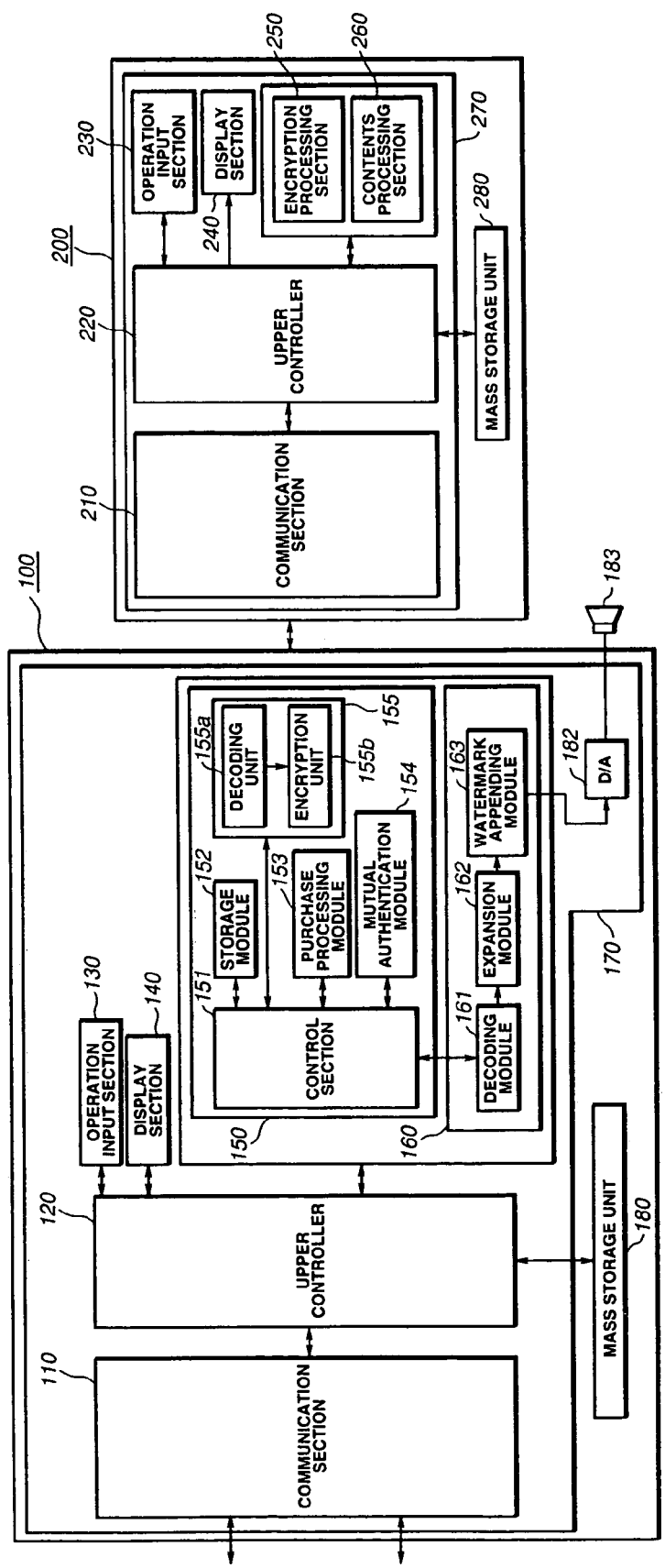
FIG. 2 is a block diagram showing the structure of a first information processing unit and a second information processing unit.

The first information processing unit 100 is an equipment held by the user and has a receiving unit 170 for receiving information such as encrypted contents data supplied from the service provider 20 through the transmission system 50, and a mass storage unit 180 for saving the information such as encrypted contents data supplied thereto, as shown in FIG. 2.

The second information processing unit 200 is an equipment held by the user and has a receiving unit 270 for receiving the information such as encrypted contents data transferred from the first information processing unit 100, and a mass storage unit 280 for saving the information such as encrypted contents data supplied thereto.

Specifically, in this contents distribution system, the first information processing unit 100 and the second information processing unit 200 held by the user viewing/listening the contents include the receiving units 170, 270, respectively, for receiving the encrypted contents data or the like sent from the service provider 20 or the other information processing unit, and the mass storage units 180, 280, respectively, for storing the encrypted contents data or the like received by the receiving units 170, 270, as shown in FIG. 2.

The receiving units 170, 270 include communication sections 110, 210 for carrying out transmission/reception of data to/from outside, upper controllers 120, 220 connected to the communication sections 110, 210, operation input sections 130, 230 connected to the upper controllers 120, 220, display sections 140, 240, encryption processing sections 150, 250, and contents processing sections 160, 260.

In the receiving unit 170 of the first information processing unit 100, the communication section 110 communicates with the service provider 20 and the key distribution center 30 and transmits/receives predetermined information such as the contents data and key. In the receiving unit 270 of the second information processing unit 200, the communication section 210 communicates with the first information processing unit 100 and transmits/receives predetermined information. The upper controllers 120, 220 carry out control to display predetermined messages or the like on the display sections 140, 240 in accordance with the data received through the communication sections 110, 210 and the operation input data from the operation input sections 130, 230, to carry out right-to-use purchase processing and transfer processing of the contents data by using the encryption processing sections 150, 250, to store the encrypted contents data or the like to the mass storage units 180, 280, and to read out and supply the encrypted contents data from the mass storage units 180, 280 to the contents processing units 160, 260.

The operation input sections 130, 230 supply signals from a remote controller, not shown, and the operation input data, that is, user-designated information, inputted by the operation of input buttons, not shown, to the upper controllers 120, 220. The display sections 140, 240 are constituted by display devices such as liquid crystal displays controlled by the upper controllers 120, 220, respectively, and are operable to generate instructions and to display information. The input operation section 130 and the display section 140, and the input operation section 230 and the display section 240 are collectively provided as touch-panel type liquid crystal displays, if necessary.

In the receiving unit 170 of the first information processing unit 100, the encryption processing section 150 carries out mutual authentication with the service provider 20 and the key distribution center 30, purchases the contents use right and carries out purchase processing, carries out encryption/decoding of predetermined data, manages a storage module 152 for holding the contents key Kc and use permission condition information, and stores the distribution key Kd and accounting information to the storage module 152. This encryption processing section 150 includes a control section 151, the storage module 152, a purchase processing module 153, a mutual authentication module 154, and an encryption/decoding module 155.

In the encryption processing section 150, the control section 151 controls each module in response to a command from the upper controller 120 and transmits the result from each module to the upper controller 120. The storage module 152 stores the data such as the accounting information and distribution key Kd supplied from the purchase processing module 153, and supplies the data such as the distribution key Kd when another functional block executes predetermined processing. The purchase processing module 153 newly generates use pen-mission condition information and accounting information from the handling policy and price information received from the service provider 20, and outputs them to the storage module 152. The mutual authentication module 154 executes mutual authentication with an external unit, and if necessary, generates and supplies a temporary key Kt (session key) to the encryption/decoding module 155. The encryption/decoding module 155 is constituted by a decoding unit 155a and an encryption unit 155b. The decoding unit 155a decodes the contents key Kc encrypted by the distribution key Kd and decodes various data encrypted by the session key Kt. The encryption unit 155b encrypts the decoded contents key Kc by a save key Ks held in the storage module 152, then outputs it to the storage module 152 through the control section 151, and encrypts various data by the session key Kt.

The contents processing section 160 carries out mutual authentication with the encryption processing section 150 to receive the contents key Kc, decodes the encrypted contents data supplied from the upper controller 120 by using the contents key Kc, expands the compressed contents data, and embeds a watermark to the contents data. This contents processing section 160 includes a decoding module 161, an expansion module 162, and an watermark embedding module 163.

In the contents processing section 160, the decoding module 161 decodes the contents data stored in the mass storage unit 180 by the contents key Kc and outputs it to the expansion module 162. The expansion module 162 expands the compressed contents data in accordance with, for example, the ATRAC (adaptive transform acoustic coding) system, and outputs it to the watermark embedding module 163. The watermark embedding module 163 embeds the individual ID of the encryption processing section which carried out purchase processing, to the contents data by a watermark technique. The contents data is then converted to analog data by a D/A converter 182 and is outputted from a speaker 183.

The encryption processing section 150 and the contents processing section 160 in the receiving unit 170 of the first information processing unit 100 are constituted by a single-chip encryption processing IC, having a multilayer structure, in which an internal memory cell is sandwiched between dummy layers such as aluminum layers and which has characteristics such as a narrow width of operating voltage or frequency (tamper resistance) to make unlawful reading of data from outside difficult.

The encryption processing section 250 and the contents processing section 260 provided in the receiving unit 270 of the second information processing unit 200 have functions similar to those of the encryption processing section 150 and the contents processing section 160 of the receiving unit 170 of the first information processing unit 100, and are constituted as a single-chip IC having the tamper resistance.

Moreover, the mass storage units 180, 280 are storage devices such as hard disks or optical discs, in which the contents data encrypted by the contents key Kc, the contents key Kc encrypted by the distribution key Kd, use permission information, price information, public key certificate, and registration information are saved.

The first embodiment of the present invention in this contents distribution system will now be described with reference to FIGS. 1 to 11.

Figure 3:
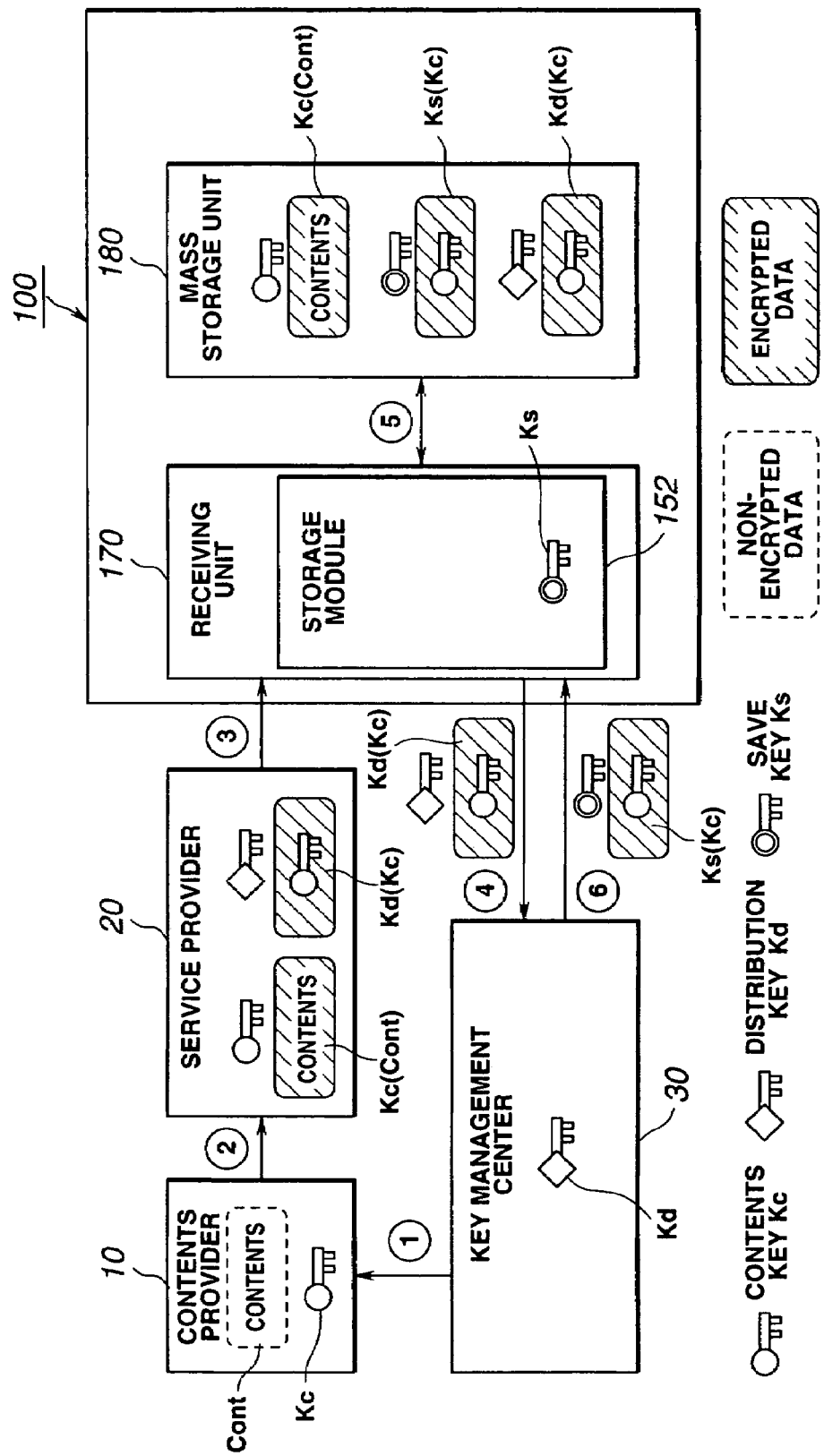
FIG. 3 is a block diagram showing the schematic structure in the case where the first information processing unit, holding only a save key, receives and saves contents data to a mass storage unit, in the contents distribution system.

First, the procedures 1 to 6 for storing the contents data, provided from the contents provider 10, to the mass storage unit 180 through the receiving unit 170 of the information processing unit 100 of the user will be described with reference to FIG. 3.

The contents provider 10, holding non-encrypted contents data, generates a contents key (e.g., common key) Kc by a random number generator, not shown, and encrypts the contents data Cont by the contents key Kc. Next, the contents provider 10 uses a distribution key (may be a common key or public key, for example) Kd supplied in advance from the key management center 30 (procedure 1), so as to encrypt the contents key Kc and other information such as use permission information. The contents provider 10 then supplies the encrypted contents data Kc (Cont) and the encrypted contents key Kd (Kc) to the service provider 20 (procedure 2).

The receiving unit 170 of the first information processing unit held by the user receives the encrypted contents data Kc (Cont) and the encrypted contents key Kd (Kc) from the service provider 20 through satellite communication, cable communication or the Internet (procedure 3). The receiving unit 170, having received these data, must decrypt the data so that the user can enjoy the contents. Therefore, the receiving unit 170 obtains the decoded contents key Kc in the following manner.

The receiving unit 170 of the first information processing unit 100 transmits the encrypted contents key Kd (Kc) directly to the key management center 30 (procedure 4). In this case, the receiving unit 170 may or may not temporarily store the encrypted contents key Kd (Kc) received by the procedure 3 into the mass storage unit 180 (procedure 5). That is, since the receiving unit 170 does not have the distribution key Kd used for the encryption of the contents key Kc and therefore cannot decode the encrypted contents key Kd (Kc), the receiving unit 170 temporarily transmits the encrypted contents key Kd (Kc) to the key management center 30.

At this point, the receiving unit 170 of the first information processing unit 100 also transmits the identification information ID and save key Ks of itself together with the encrypted contents key Kd (Kc). The key management center 30, having received these data, decodes the contents key Kc from the encrypted contents key Kd (Kc) by using its own distribution key Kd and re-encrypts the contents key Kc by the save key Ks received from the receiving unit 170 of the user. At this point, the key management center 30 further carries out accounting processing in accordance with the identification information of the user. Then, the key management center 30 returns the encrypted contents key Ks (Kc) encrypted by the save key Ks to the receiving unit (procedure 6).

The key management center 30 may send these data after encrypting them by using the session key established by mutual authentication with the receiving unit 170. Specifically, in encrypting the contents key or the like using the session key, the receiving unit 170 does not transmit the save key Ks to the key management center 30, and the key management center 30 encrypts the contents key Kc by the session key and transmits the encrypted contents key to the receiving unit 170. After receiving the encrypted contents key or the like encrypted by the session key, the receiving unit 170 temporarily decodes the contents key Kc or the like by using the session key and encrypts the decoded contents key Kc or the like by using its own save key Ks.

The receiving unit 170, having received the encrypted contents key Ks (Kc) encrypted by the save key Ks, saves the encrypted contents key Ks (Kc) to the mass storage unit 180. Since the save key Ks is saved in the storage module 152 of the receiving unit 170, the receiving unit 170 can decode the contents key Kc at any time and can also decode the contents data Cont from the encrypted contents data Kc (Cont) using this contents key Kc. Although only one key is stored in the mass storage unit 180 shown in FIG. 3, a number of encrypted contents and contents keys may be actually saved.

As described above, in the contents distribution system to which the present invention is applied, the contents data Cont held by the contents provider 10 can be encrypted by the contents key Kc and provided to the receiving unit 170 of the user, and the contents key Kc used for the encryption of the contents data Cont can also be encrypted and provided to the receiving unit 170 of the user. The receiving unit 170 of the user can decode the encrypted contents key Kc provided thereto and decode the contents data Cont.

The encryption algorithm may be any algorithm as long as it is for encrypting data to prevent the contents thereof from being known to a third party. For example, a public key encryption system and a common key encryption system are generally known as the encryption algorithms. The public key encryption system is an encryption algorithm using different keys for encryption and for decoding, and is exemplified by RSA encryption and elliptic curve encryption. In this public key encryption system, of the two keys, the key to be made public is called public key and the key secretly held by the user is called secret key. On the other hand, the common key encryption system is an encryption algorithm using the same key for encryption and for decoding, and is exemplified by DES (data encryption standard) encryption, FEAL (fast encryption algorithm of NTT) and Misty (of Mitsubishi Electric). In this common key encryption system, the key to be used is called common key.

The mutual authentication using the public key encryption between an equipment A and an equipment B for confirming whether they are valid counterparts to each other will now be described with reference to FIG. 4.

The public key, secret key and identification information of the equipment A are referred to as Kpa, Ksa and IDa, respectively. The public key, secret key and identification information of the equipment B are referred to as Kpb, Ksb and IDb, respectively. The public key and secret key of the authentication center are referred to as Kpc and Ksc, respectively.

The certificate Ca indicating the validity of the public key Kpa of the equipment A is expressed by the following equation (1).

$$Ca = IDa + \text{(other information)} + Kpa + Siga \qquad (1)$$

Siga in this equation (1) is signature data, which is expressed by the following equation (2).

$$Siga = Enc(\text{Hash}(IDa + \text{(other information)} + Kpa), Ksc) \qquad (2)$$

In the equation (2), Hash( ) is a unidirectional function called hash function. This hash function is a function for compressing data having a long data length to data having a short fixed bit length, and its input is difficult to find from its output. The hash function is exemplified by MD (message digest) 5 and SHA (secure hash algorithm)-1. The hash function is described in detail in Bruce Schneier, "Applied Cryptography (Second Edition), Wiley". The sign "+" means coupling of data. For example, "16-bit data+16-bit data" means consecutively arrayed 32-bit data. The sign "Enc( )" indicates encryption processing and "Enc(x, y)" indicates encryption of data "x" using the encryption key "y". In this case, it is assumed that the public key encryption (e.g., RSA encryption) is used. Although not used in the equation (2), "Deco" indicates decoding processing and "Enc(x, z)" indicates decoding of data "x" using the decoding key "z". The certificate Cb indicating the validity of the public key Kpb of the equipment B is similar to the certificate Ca.

Figure 4:
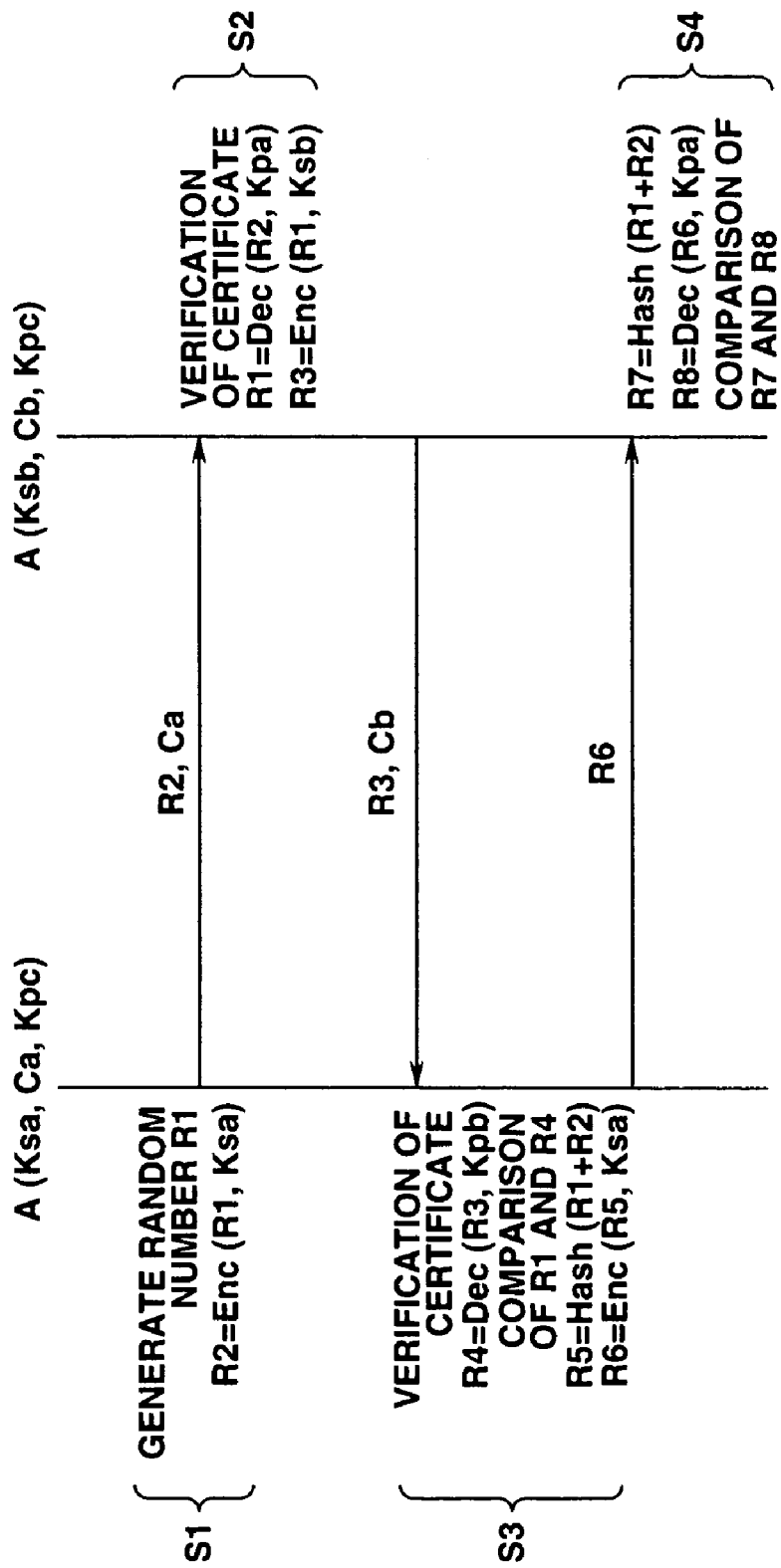
FIG. 4 is a view for illustrating the procedures of mutual authentication processing based on a public key.

The mutual authentication is carried out in accordance with the procedures of steps S1 to S4 shown in FIG. 4. The equipment A and the equipment B hold the certificates Ca, Cb of their respective public keys and the public key Kpc of the authentication center, in addition to their respective keys and identification information.

First, at step S1, the equipment A generates a random number R1. Also, the equipment A encrypts the random number R1 by the secret key Ksa to generate authentication data R2, as expressed by the following equation (3).

$$R2 = Enc(R1, Ksa) \qquad (3)$$

Then, the equipment A sends the certificate Ca and authentication data R2 to the equipment B.

Subsequently, at step S2, the equipment B verifies whether the certificate Ca(=IDa+(other information)+Kpa+Siga) sent from the equipment A is correct or not. Specifically, the equipment B first generates D1 Hash (IDa+(other information)+Kpa). Then, the equipment B compares D1 with Dec(Siga, Kpc), and determines that the public key Kpa is valid if D1 is coincident with Dec(Siga, Kpc).

On determining that the public key Kpa is valid, the equipment B decodes the authentication data R2 by the public key Kpa to reproduce the random number R1, as expressed by the following equation (4).

$$R1 = Dec(R2, Kpa) \qquad (4)$$

Next, the equipment B encrypts the random number R1 by the secret key Ksb to generate authentication data R3, as expressed by the following equation (5).

$$R3 = Enc(R1, Ksb) \qquad (5)$$

Then, the equipment B sends the certificate Cb and authentication data R3 to the equipment A.

Subsequently, at step S3, the equipment A verifies the certificate Cb sent from the equipment B, similarly to step S2, and determines whether the public key Kpb is valid or not. On determining that the public key Kpb is valid, the equipment A decodes the authentication data R3 by the public key Kpb to generate verification data R4, as expressed by the following equation (6). Then, the equipment A compares the verification data R4 with the random number R1.

$$R4 = Dec(R3, Kpb) \qquad (6)$$

If the random number R1 and the verification data R4 are coincident with each other, it is determined that the equipment B has the valid secret key Ksb and the validity of the equipment B can be confirmed. If not coincident, the equipment B can be determined as an invalid equipment that has illegitimately seen the certificate Cb.

Next, the equipment A generates authentication data R5 from the random number R1 and authentication data R2 using the hash function, as expressed by the following equation (7).

$$R5 = \text{Hash}(R+R2) \quad (7)$$

Then, the equipment A encrypts the authentication data R5 by the secret key Ksa to generate R6, as expressed by the following equation (8).

$$R6 = \text{Enc}(R5, Ksa) \quad (8)$$

Then equipment A then sends R6 to the equipment B.

Subsequently, at step S4, the equipment B generates verification data R7 from the random number R1 and authentication data R2 using the hash function, as expressed by the following equation (9).

$$R7 = \text{Hash}(R1+R2) \quad (9)$$

Next, the equipment B decodes R6 sent thereto using the public key Kpa to generate verification data R8, expressed by the following equation (10).

$$R8 = \text{Dec}(R6, Kpa) \quad (10)$$

Then, the equipment B compares the verification data R7 with the verification data R8. If these data are coincident with each other, it is determined that the equipment A has the valid secret key Ksa and the validity of the equipment A can be confirmed. If not coincident, the equipment A can be determined as an equipment that has illegitimately seen the certificate Ca.

As described above, the equipment A and the equipment B can carry out mutual authentication for confirming that they are valid to each other. The data such as the random number R1 may be used as a temporary key for that time only, and this key is called session key.

The contents decoding processing in the contents distribution system is to decrypt the above-described contents key, extract the use conditions or the like, and decode the encrypted contents in accordance with the use conditions. For example, under such conditions that the contents can be decoded only 10 times, the number of times of use included in the use conditions appended to the contents key is reduced every time the contents key is decoded. Also, under such conditions that copying is prohibited, copy restriction such as prohibition of decoding of contents data is provided in the case where transfer of contents to another equipment is attempted.

In this contents distribution system, the following processing 1 to 3 is considered as the accounting processing of the key management center 30.

1. The key management center 30 holds in advance the account number or credit card number associated with the identification information, and charges the fee from the bank or credit card company in accordance with this number.

2. The key management center 30 sends the account number or credit card number together with the key every time it sends the key, so as to make settlement.

3. The key management center 30 subtracts the fee from the electronic money stored in the storage module 152 inside the receiving unit 170.

Figure 5:
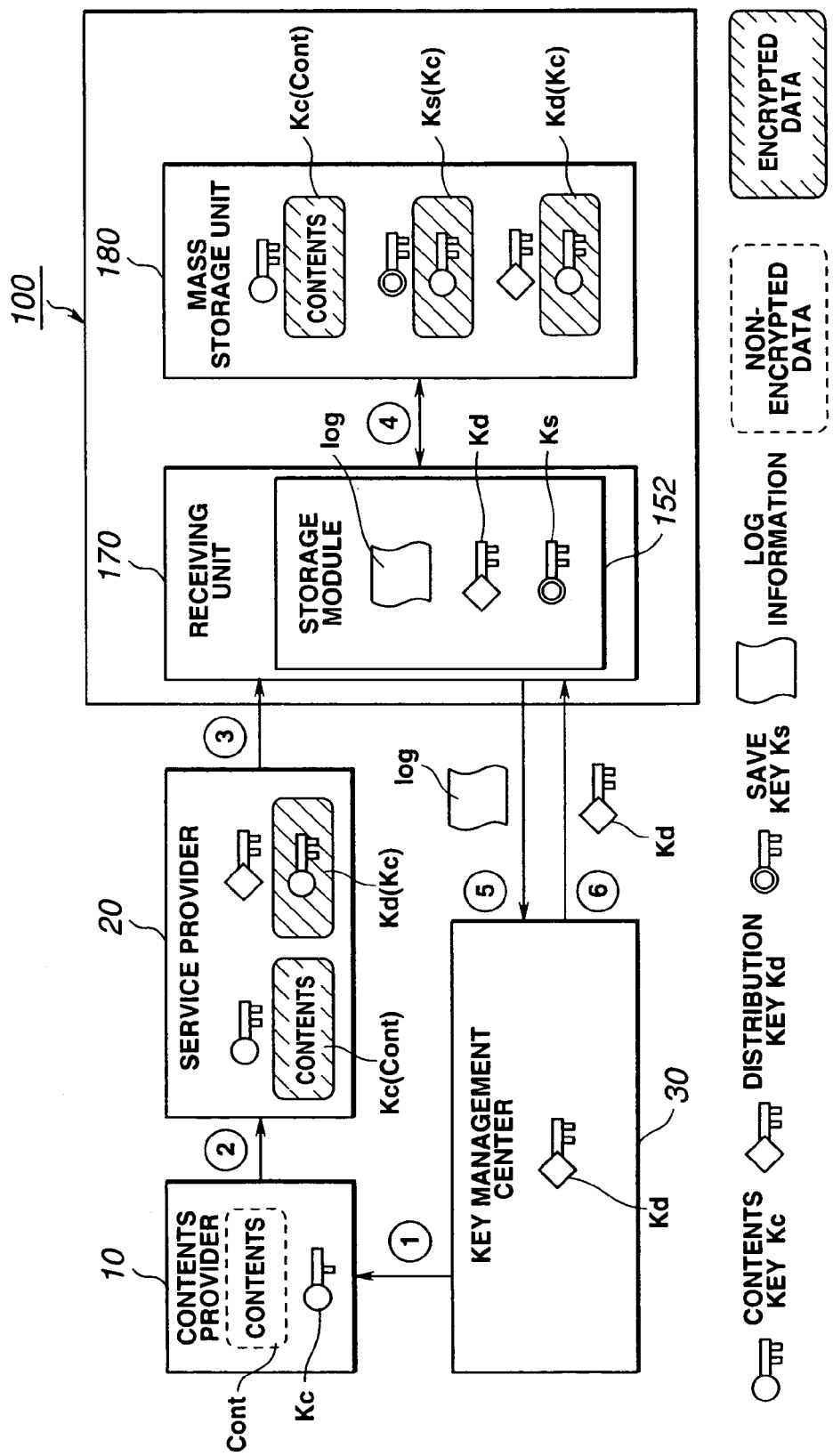
FIG. 5 is a block diagram showing the schematic structure in the case where the first information processing unit, holding a distribution key, receives and saves contents data to a mass storage unit, in the contents distribution system.

In the contents distribution system, as shown in FIG. 5, the distribution key Kd is held in advance in the storage module 152 of the receiving unit 170 of the first information processing unit 100, so that the contents key Kc may be decoded from the encrypted contents key Kd(Kc) using the distribution key Kd.

In this case, on receiving the encrypted contents data Kc(Cont) and the encrypted contents key Kd(Kc) provided from the service provider 20 through satellite communication, cable communication or the Internet (procedure 3), the receiving unit 170 of the first information processing unit 100 held by the user decodes the contents key Kc from the encrypted contents key Kd(Kc) using the distribution key Kd held in the storage module 152, then re-encrypts the contents key Kc by its own save key Ks, and saves the result as Ks(Kc) into the mass storage unit 180 (procedure 4). Moreover, the receiving unit 170 prepares log information "log" every time it decodes the contents key Kc, and accumulates this log information "log" into the storage module 152. Then, the accounting processing is carried out as the receiving unit 170 transmits the log information "log" to the key management center 30 (procedure 5) when a predetermined time period has elapsed or when decoding of the distribution key Kd has been carried out a predetermined number of times or when the distribution key Kd is to be updated.

Figure 6:
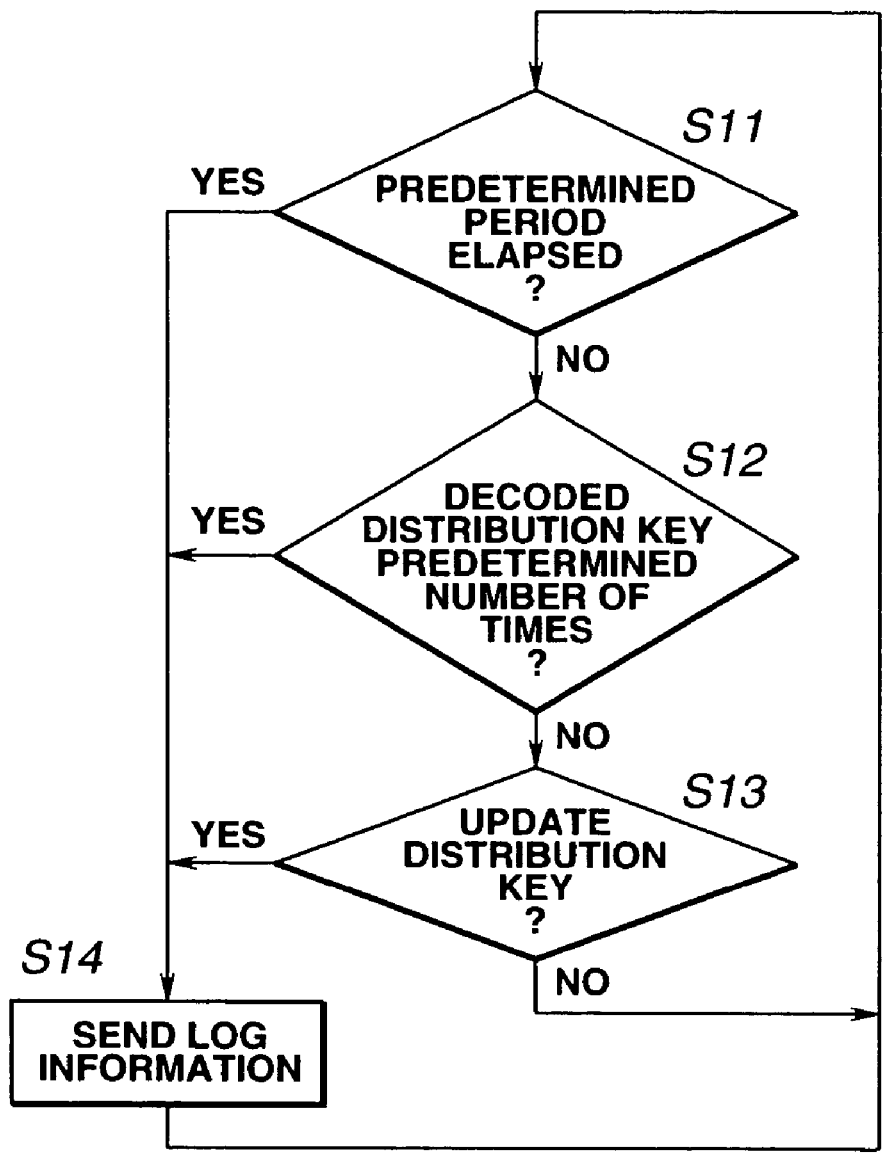
FIG. 6 is a flowchart of accounting carried out by the first information processing unit.

Specifically, the receiving unit 170 of the first information processing unit 100, after carrying out the previous accounting processing, discriminates whether a predetermined time period has been elapsed or not (step S11), whether decoding of the encrypted distribution key Kd has been carried out a predetermined number of times or not (step S12), and whether the distribution key is to be updated or not (step S13), as shown in the flowchart of accounting processing of FIG. 6. If the result of discrimination at any of steps S11 to S13 is YES, the receiving unit 170 transmits the log information "log" to the key management center 30 (step S14), thereby carrying out the accounting processing. Then, after the log information "log" is transmitted at step S14, the accounting processing of this time is reset and the processing returns to step S11 to start next accounting processing.

As shown in FIG. 5, the distribution key Kd is provided in advance to the contents provider 10 from the key management center 30 (procedure 1), and the encrypted contents data Kc(Cont) and the encrypted contents key Kd(Kc) are supplied to the service provider 20 from the contents provider 10 (procedure 2).

In the case where the distribution key Kd is thus saved in advance to the storage module 152 of the first information processing unit 100, the distribution key Kd used by the contents provider 10 is updated every predetermined period (e.g., one month), and in accordance therewith, the distribution key Kd is supplied also to the first information processing unit 100 from the key management center 30 (procedure 6). In short, since the distribution key Kd is common to all the equipments, it is changed from time to time in view of its safety.

The first information processing unit 100 and the second information processing unit 200 connected to the first information processing unit 100 will now be described further in detail with reference to FIGS. 7 and 8.

Figure 7:
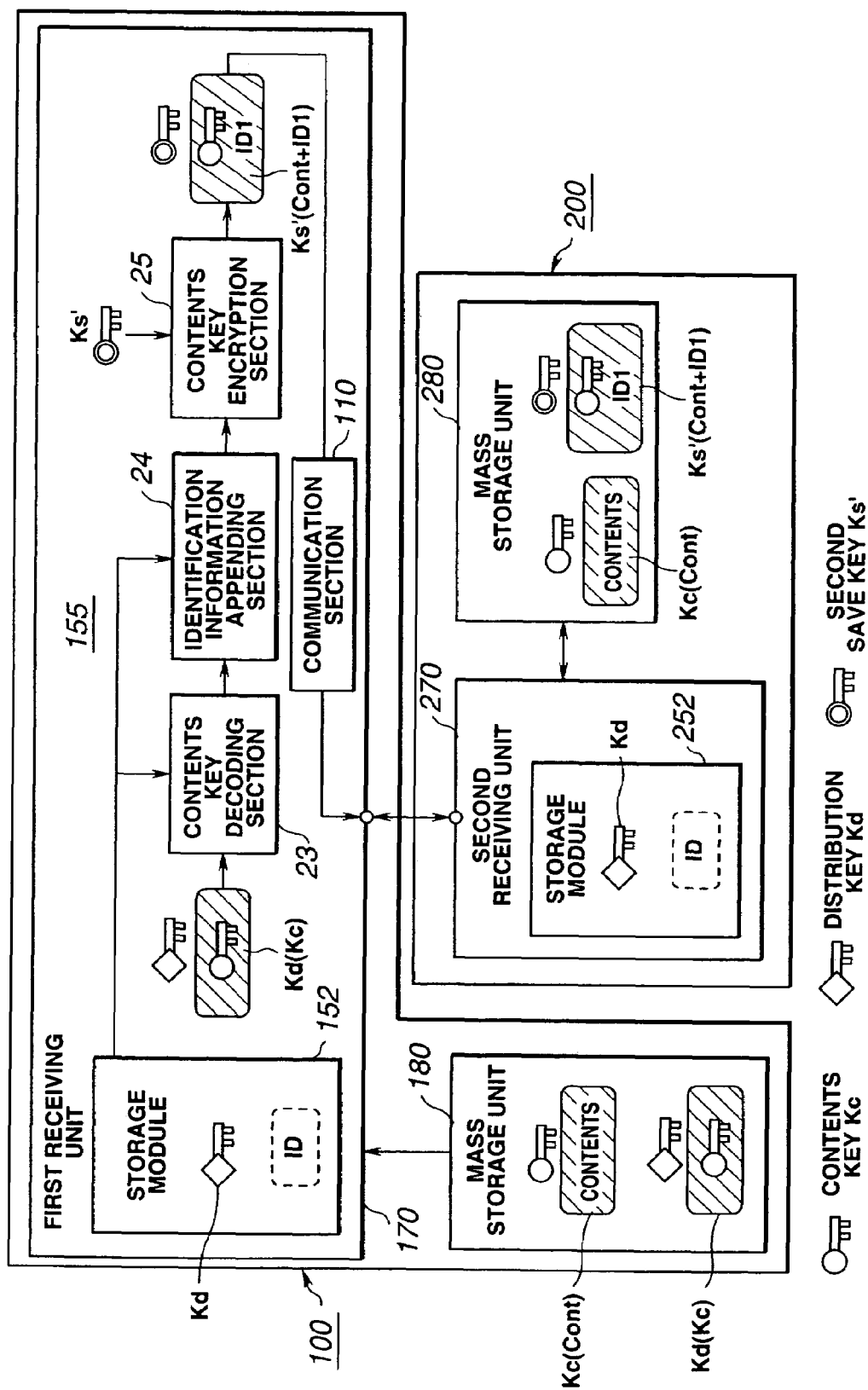
FIG. 7 is a block diagram showing the schematic structure of a receiving unit of the first information processing unit in the contents distribution system according to the first embodiment of the present invention.

The encryption/decoding module 155 in the receiving unit 170 of the first information processing unit 100 includes the storage module 152, a contents key decoding section 23 for decoding the contents key Kc from the encrypted contents key Kd(Kc) encrypted by the distribution key Kd, an identification information appending section 24 for appending identification information ID proper to the receiving unit 170 to the decoded contents key Kc, and a contents key encryption section 25 for encrypting the contents key (Kc+ID) having the identification information ID appended thereto by using the save key Ks' of the second information processing unit 200 as the distribution key, as shown in FIG. 7. The encryption/decoding module 155 transmits the encrypted contents data Kc(Cont) and the encrypted contents key Ks'(Kc+ID) to the second information processing unit 200 through the communication section 110. Also, the receiving unit 170 is connected to the mass storage unit 180 through an IEEE1394 interface or the like.

In the receiving unit 170 of the first information processing unit 100, the storage module 152 is made up of a flash memory in an IC chip or the like. The contents key decoding section 23, the identification information appending section 24 and the contents key encryption section 25 are constituted by ASIC or programs in the IC chip.

The storage module 152 may be a memory (flash memory, EEPROM, etc.) in a single-chip IC having the tamper resistance and incorporated in the first receiving unit 170, an IC card capable of sending and receiving data to and from the first receiving unit 170, or any storage medium that can prevent a third party from easily confirming the contents thereof.

The mass storage unit 180 may be any removable or fixed storage medium or storage device such as a hard disk, an optical disc, a tape medium or a semiconductor memory. It may also be externally connected to or built inside the first receiving unit 170. In these mass storage units 180, the identification information (ID) for identifying the respective storage units may be written and this identification information may not be rewritable.

Figure 8:
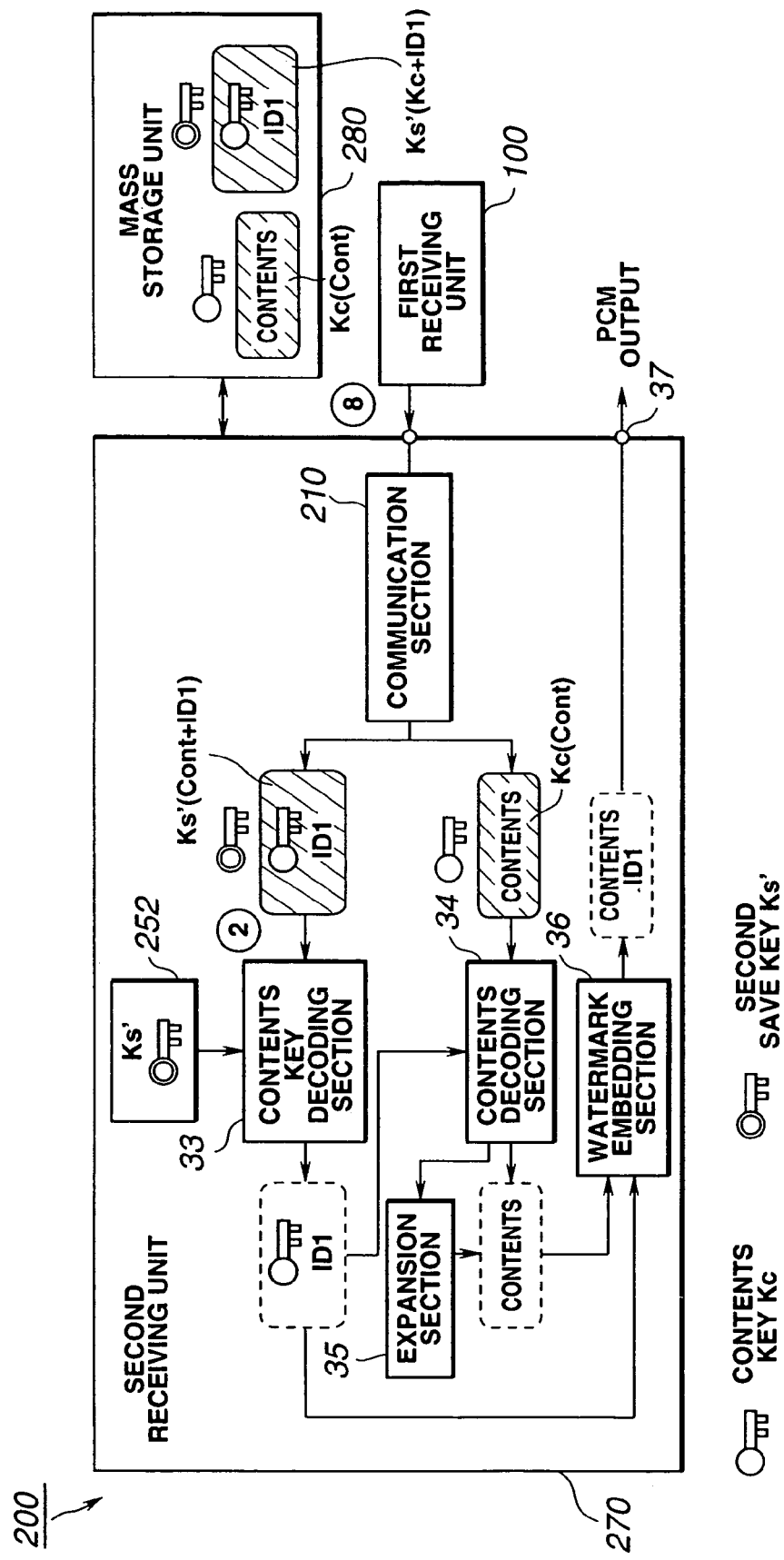
FIG. 8 is a block diagram showing the schematic structure of a receiving unit of the second information processing unit in the contents distribution system according to the first embodiment of the present invention.

On the other hand, the receiving unit 270 of the second information processing unit 200 has a contents key decoding section 33 in the encryption processing section 250 for decoding the encrypted contents key Ks'(Kc+ID) encrypted by the save key Ks' uniquely held by the receiving unit 270, as shown in FIG. 8. Also, as the decoding module and the watermark embedding module in the contents processing section 260, the receiving unit 270 has a contents decoding section 34 for decoding the encrypted contents data Kc(Cont) encrypted by the contents key Kc, an expansion section 35 for expanding the contents data decoded by the contents decoding section 34, and a watermark embedding section 36 for embedding identification information ID1 proper to the first information processing unit 100 by watermark processing with respect to the contents data expanded by the expansion section 35. The contents data in which the identification information ID1 is embedded by watermark embedding is outputted from an output terminal 37. The receiving unit 270 receives the encrypted contents data Kc(Cont) and the encrypted contents key Ks'(Kc+1D) from the first information processing unit 100 through the communication section 210. Moreover, the receiving unit 270 is connected to the mass storage unit 280 through an IEEE1394 interface or the like.

The expansion section 35 is exemplified by an MPEG decoder for decoding data which is coded in accordance with the MPEG (Moving Picture Experts Group) standard, or an ATRAC decoder for decoding data which is coded in accordance with the so-called ATRAC (Adaptive Transform Acoustic Coding) standard.

A storage module 252 of the receiving unit 270 of the second information processing unit 200 is made up of a flash memory in an IC chip, similarly to the storage module 152 in the receiving unit 170 of the first information processing unit 100. The contents key decoding section 33, the contents decoding section 34, the watermark embedding section 36 and the expansion section 35 are constituted by AS1C or programs in the IC chip.

The receiving unit 170 of the first information processing unit 100 and the receiving unit 270 of the second information processing unit 200 have their respective proper identification information (ID1, ID2), and hold their respective unique save keys Ks, Ks'. The save key uniquely held by the receiving unit 170 of the first information processing unit 100 is hereinafter referred to as first save key Ks, and the save key uniquely-held by the receiving unit 270 of the second information processing unit 200 is hereinafter referred to as second save key Ks'.

The watermark embedding section 36 of the receiving unit 270 of the second information processing unit 200 is adapted for embedding watermark information to the contents data. With respect to the audio data and image data to which the information is embedded by the watermark processing, the embedded information is difficult to remove and the information can be taken out even after filtering processing or compression/expansion processing is repeated.

The procedure for transferring the contents data stored in the mass storage unit 180 of the first information processing unit 100 to the second information processing unit 200 will now be described.

Figure 9:
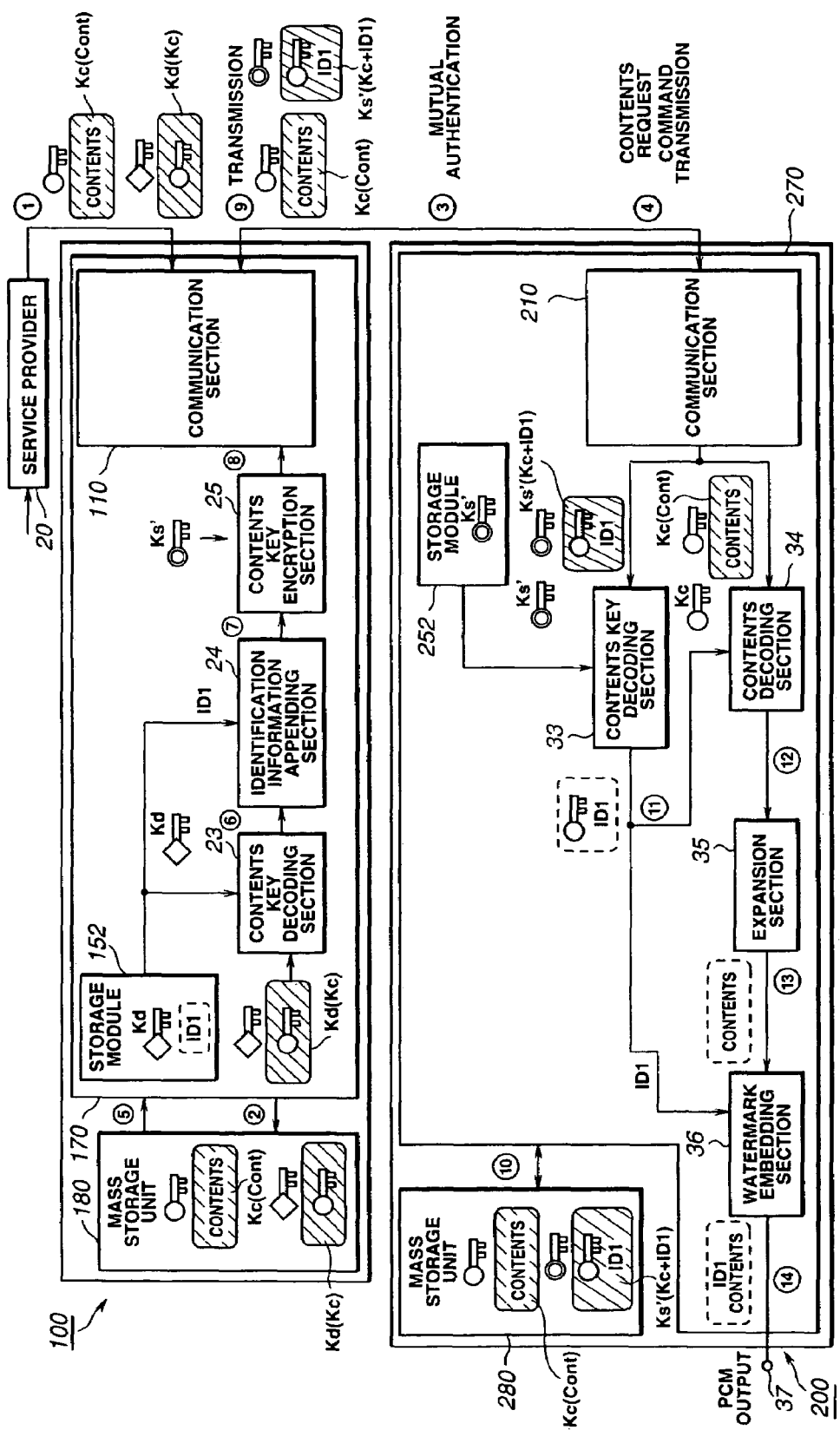
FIG. 9 shows the case where contents data stored in the mass storage unit of the first information processing unit is transferred to the second information processing unit in accordance with the first procedure.

First, the first procedures 1 to in the case of transferring the contents data stored in the mass storage unit 180 of the first information processing unit 100 to the second information processing unit 200 will be described with reference to FIG. 9.

In the case where the contents data is to be transferred from the first information processing unit 100 to the second information processing unit 200 in accordance with the first procedures, the distribution key Kd and the identification information ID1 proper to the first information processing unit are saved in advance in the storage module 152 of the receiving unit 170 of the first information processing unit 100. The first information processing unit 100 receives the encrypted contents data Kc(Cont) encrypted by the contents key Kc sent from the service provider 20 through satellite communication or through the Internet and the encrypted contents key Kd(Kc) encrypted by the distribution key Kd, by using the receiving unit 170 (procedure 1), and saves the received encrypted contents data Kc(Cont) and encrypted contents key Kd(Kc) to the mass storage unit 180 (procedure 2).

Then, in the first procedures, mutual authentication is first carried out between the first information processing unit 100 and the second information processing unit 200 in order to make a contents transfer request from the second information processing unit 200 to the first information processing unit 100 (procedure 3). This mutual authentication is first carried out between the first information processing unit 100 and the second information processing unit 200 in order to make a contents transfer request to the first information processing unit 100 in response to user-designated information inputted from the operation input section 230 to the upper controller 220 in the receiving unit 270 of the second information processing unit 200 shown in FIG. 2. The mutual authentication processing may be carried out through the communication sections 110, 210 between the first information processing unit 100 and the second information processing unit 200 by inputting a signal from a remote controller, not shown, or operation input data due to the operation of an input button, not shown, that is, user-designated information from the operation input section 130 to the upper controller 120 in the receiving unit 170 of the first information processing unit 106 shown in FIG. 2.

Subsequently, the receiving unit 270 of the second information processing unit 200 encrypts by the session key a contents request command including the contents number of the contents which the user wants to copy from the first information processing unit 100 and the second save key Ks', and sends the encrypted contents request command to the receiving unit 170 of the first information processing unit 100 (procedure 4).

The receiving unit 170 of the first information processing unit 100, having received the contents request command, decodes the received data by the session key and thus obtains the contents number and the second save key Ks'. The receiving unit 170 then retrieves and takes out the contents and the contents key corresponding to the contents key from the mass storage unit 180 (procedure 5). Subsequently, the receiving unit 170 of the first information processing unit 100 causes the contents key decoding section 23 to decode the contents key Kc by the distribution key Kd held in the storage module 152 (procedure 6), and causes the identification information appending section 24 to append its own identification information ID1 to the decoded contents key Kc (procedure 7). For example, if the contents key Kc is expressed as "0123456789ABCDEF" while the identification information ID1 of the first information processing unit 100 is expressed as "0000111122223333", the key data having the identification information appended thereto is expressed as "0123456789ABCDEF0000111122223333".

Subsequently, the receiving unit 170 of the first information processing unit 100 causes the contents key encryption section 25 to encrypt the contents key Kc having its own identification information ID1 appended thereto, by using the second save key Ks' (procedure 8). Then, the receiving unit 170 of the first information processing unit 100 transmits the encrypted contents key Ks'(Kc+ID1) which has the identification information appended thereto and is encrypted and the encrypted contents data Kc(Cont) to the receiving unit 270 of the second information processing unit 200 through the communication section 110 (procedure 9).

The receiving unit 270 of the second information processing unit 200 receives the encrypted contents key Ks' (Kc+ID) and the encrypted contents data Kc(Cont) transmitted from the first information processing unit 100, through the communication section 210, and saves these key and data to the mass storage unit 280 (procedure 10).

Then, the receiving unit 270 of the second information processing unit 200 causes the contents key decoding section 33 to decode the received encrypted contents key Ks'(Kc+ID) using the second save key Ks' stored in the storage module 252 (procedure 11). The receiving unit 270 of the second information processing unit 200 can obtain the contents key Kc and the identification information ID1 of the first information processing unit 100 by decoding the encrypted contents key Ks'(Kc+ID1). Also, the receiving unit 270 of the second information processing unit 200 causes the contents decoding section 34 to decode the received encrypted contents data Kc(Cont) using the contents key Kc (procedure 12). The expansion section 35 performs predetermined expansion processing on the contents data decoded by the contents decoding section 34. For example, if the contents data are music data compressed in accordance with the ATRAC standard, the expansion section 35 carries out ATRAC expansion processing to convert the contents data to PCM data (procedure 13). Then, the watermark embedding section 36 embeds the identification information ID1 proper to the first information processing unit 100, obtained by the contents key decoding section 33 decoding the encrypted contents key Ks'(Kc+ID1), to the contents data expanded by the expansion section 35 by the watermark processing, and outputs the resultant data through the output terminal 37 (procedure 14).

The foregoing is the first procedures for transferring and reproducing the contents data stored in the mass storage unit 180 of the first information processing unit 100 to the second information processing unit 200.

Figure 10:
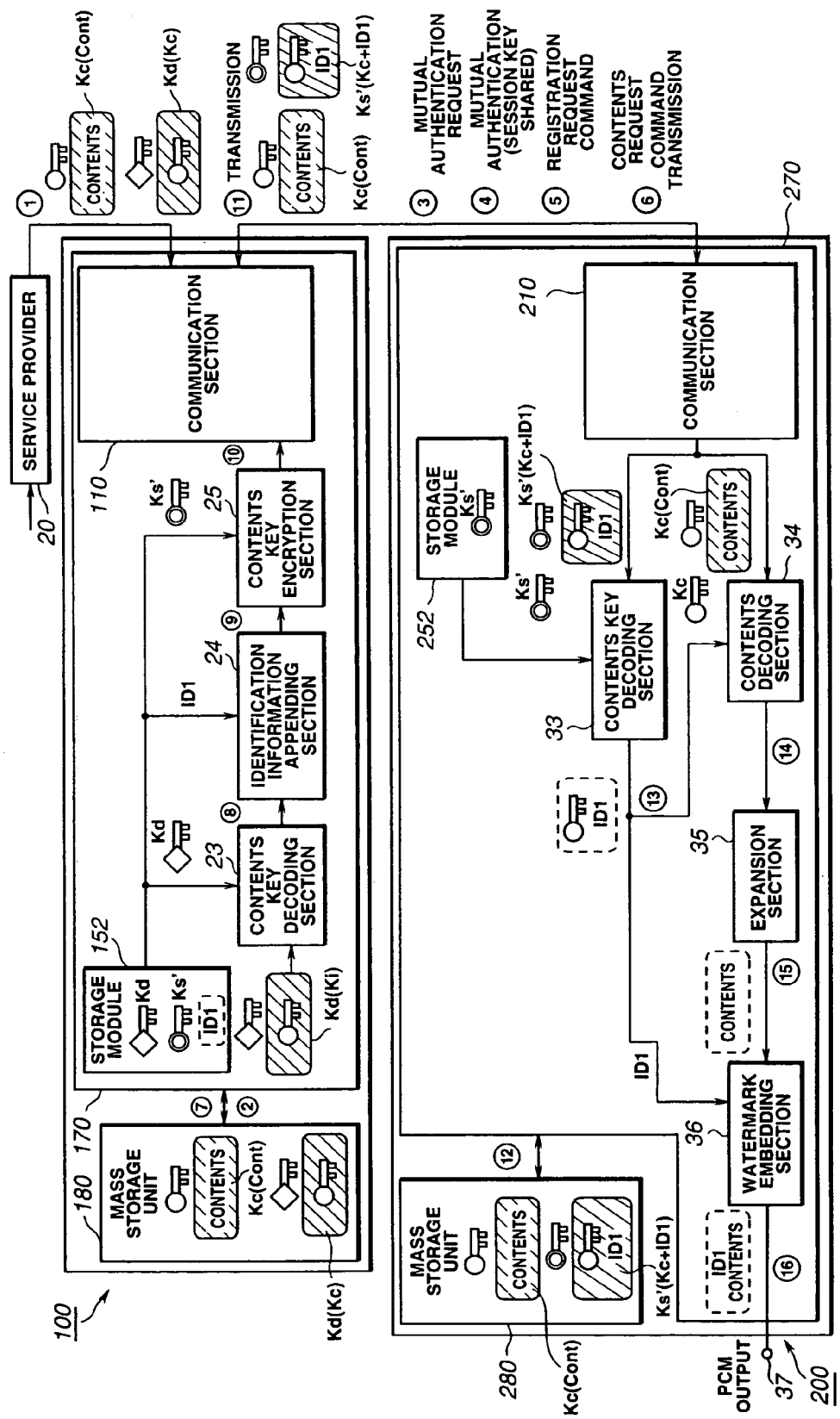
FIG. 10 shows the case where contents data stored in the mass storage unit of the first information processing unit is transferred to the second information processing unit in accordance with the second procedure.

The second procedures for transferring and reproducing the contents data stored in the mass storage unit 180 of the first information processing unit 100 to the second information processing unit 200 will now be described with reference to FIG. 10.

While the contents request command including the contents number of the contents to be copied and the second save key Ks' is sent in the procedure 4 in accordance with the above-described first procedures 1 to 14, the second save key Ks' is registered in advance to the storage module 152 of the receiving unit 170 of the first information processing unit 100 in accordance with the following second procedures 1 to 16.

Also in the case where the contents data is to be transferred from the first information processing unit 100 to the second information processing unit 200 in accordance with the second procedures, the distribution key Kd and the identification information ID1 proper to the first information processing unit are saved in advance to the storage module 152 of the receiving unit 170 of the first information processing unit 100. The first information processing unit 100 causes the receiving unit 170 to receive the encrypted contents data Kc(Cont) encrypted by the contents key Kc sent from the service provider 20 through satellite communication or through the Internet and the encrypted contents key Kd(Kc) encrypted by the distribution key Kd (procedure 1), and saves the received encrypted contents data Kc(Cont) and encrypted contents key Kd(Kc) to the mass storage unit 180 (procedure 2).

In accordance with the second procedures, registration operation for registering the second save key Ks' to the first receiving unit 170 is carried out. In starting the registration operation, a mutual authentication request is sent from the receiving unit 270 of the second information processing unit 200 to the receiving unit 170 of the first information processing unit 100 by inputting a signal from a remote controller, not shown, or operation input data due to the operation of an input button, not shown, that is, user-designated information from the operation input section 230 to the upper controller 220 (procedure 3). After that, mutual authentication is carried out between both units and a session key is shared (procedure 4). Subsequently, the receiving unit 270 of the second information processing unit 200 encrypts a registration request command including the second save key Ks' by the session key and sends the encrypted registration request command to the first receiving unit 170. The receiving unit 170 of the first information processing unit 100, having received the command, registers the second save key Ks' of the second information processing unit 200 to the storage module 152 (procedure 5).

Subsequently, the receiving unit 270 of the second information processing unit 200 encrypts the contents request command including the contents number of the contents to be copied from the first information processing unit 100, by using the session key, and sends the encrypted contents request command to the receiving unit 170 of the first information processing unit 100 (procedure 6). Having received this, the receiving unit 170 of the first information processing unit 100 decodes the received data by the session key so as to obtain the contents number. Then, the receiving unit 170 of the first information processing unit 100 retrieves and takes out the encrypted contents data Kc(Cont) and encrypted contents key Kd(Kc) corresponding to the contents number from the mass storage unit 180 (procedure 7).

Subsequently, the receiving unit 170 of the first information processing unit 100 decodes the contents key Kc from the encrypted contents key Kd(Kc) by the distribution key Kd in the storage module 152 (procedure 8), and appends its own identification information ID1 to the decoded contents key Kc (procedure 9). Subsequently, the receiving unit 170 encrypts this data (Kc+ID1) using the second save key Ks' registered to the storage module 152 (procedure 10). Then, the receiving unit 170 of the first information processing unit 100 transmits the encrypted contents key Ks'(Kc+ID1) which has the identification information ID1 appended thereto and is encrypted and the encrypted contents data Kc(Cont) to the receiving unit 270 of the second information processing unit 200 through the communication section 110 (procedure 11).

Subsequently, the receiving unit 270 of the second information processing unit 200 receives the encrypted contents key Ks'(Kc+ID1) and the encrypted contents data Kc(Cont) transmitted from the receiving unit 170 of the first information processing unit 100, and take them into the mass storage unit 280 (procedure 12). Then, the receiving unit 270 causes the contents key decoding section 33 to decode the contents key Kc and the identification information ID1 from the received encrypted contents key Ks'(Kc+ID1) by using the second save key Ks' stored in the storage module 252 (procedure 13). The receiving unit 270 of the second information processing unit 200 can obtain the contents key Kc and the identification information ID1 of the receiving unit 170 of the first information processing unit 100 by decoding the encrypted contents key Ks'(Kc+ID1). The receiving unit 270 of the second information processing unit 200 causes the contents decoding section 34 to decode the contents data from the encrypted contents data Kc(Cont) using the contents key Kc (procedure 14). The expansion section 35 performs expansion processing on the contents data decoded by the contents decoding section 34. For example, the expansion section 35 carries out ATRAC expansion processing to obtain PCM data (procedure 15). Then, the watermark embedding section 36 embeds the identification information ID1 proper to the first information processing unit 100 obtained by decoding the encrypted contents key Ks'(Kc+ID1) by the contents key decoding section 33, to the contents data expanded by the expansion section 35 by watermark embedding processing, and outputs the resultant data from the output terminal 37 (procedure 16).

The foregoing is the second procedures for transferring and reproducing the contents data stored in the mass storage unit 180 of the first information processing unit 100 to the second information processing unit 200.

Figure 11:
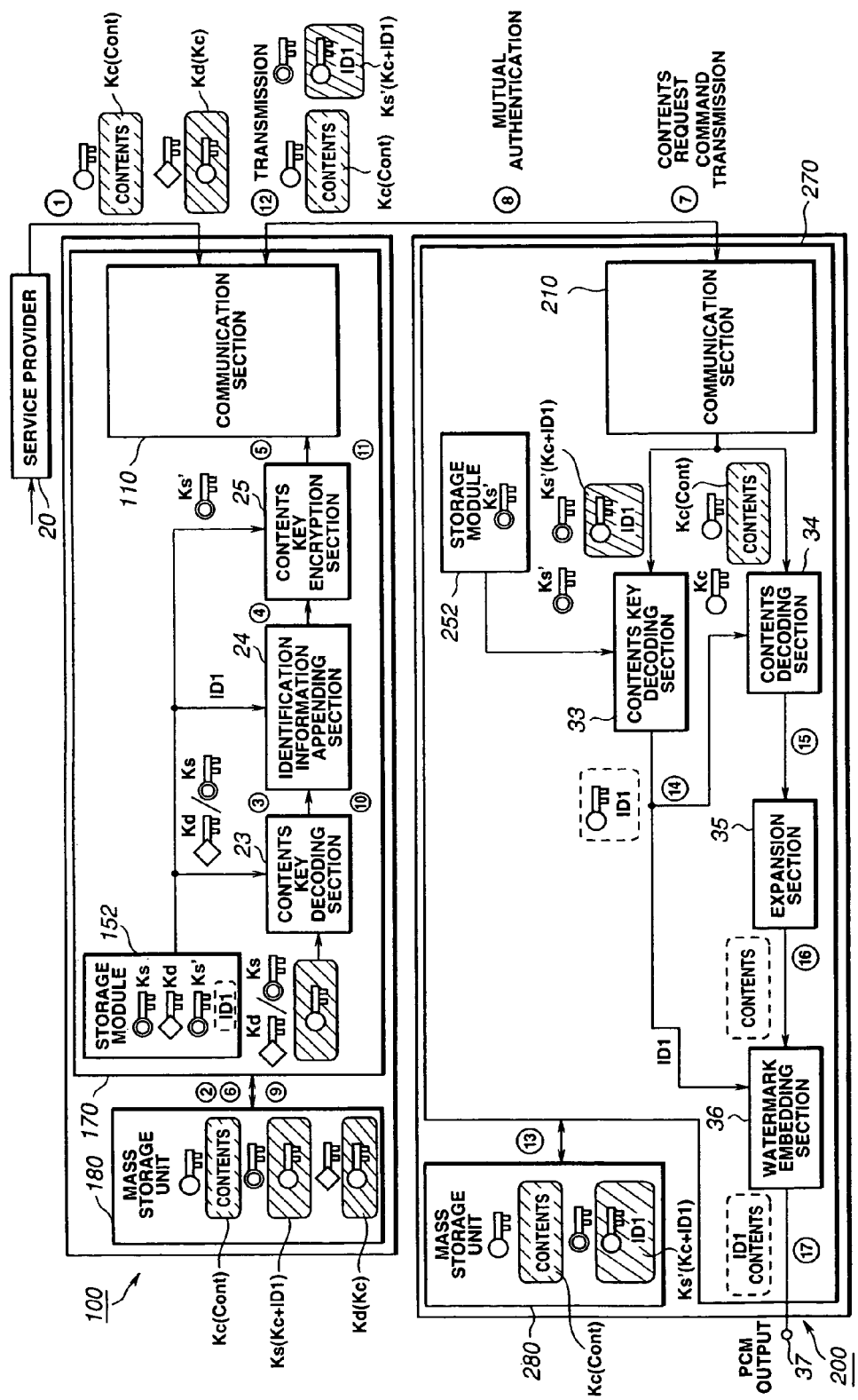
FIG. 11 shows the case where contents data stored in the mass storage unit of the first information processing unit is transferred to the second information processing unit in accordance with the third procedure.

The third procedures for transferring and reproducing the contents data stored in the mass storage unit 180 of the first information processing unit 100 to the second information processing unit 200 will now be described with reference to FIG. 11.

While the identification information ID1 of the first information processing unit 100 is appended to the contents key Kc in copying (transferring) to the second information processing unit 200 in accordance with the above-described first procedures, the identification information ID1 of the first information processing unit 100 is appended in advance to the contents key Kc and then stored in the mass storage unit 180 in accordance with the following third procedures.

Specifically, in the case where the contents data is to be transferred from the first information processing unit 100 to the second information processing unit 200 in accordance with the third procedures, the distribution key Kd and the identification information ID1 proper to the first information processing unit are saved in advance to the storage module 152 of the receiving unit 170 of the first information processing unit 100. The first information processing unit 100 causes the receiving unit 170 to receive the encrypted contents data Kc(Cont) encrypted by the contents key Kc sent from the service provider 20 through satellite communication or through the Internet and the encrypted contents key Kd(Kc) encrypted by the distribution key Kd (procedure 1), and saves the received encrypted contents data Kc(Cont) and encrypted contents key Kd(Kc) to the mass storage unit 180 (procedure 2).

In accordance with the third procedures, in the receiving unit 170 of the first information processing unit 100, the contents key decoding section 23 decodes the encrypted contents key Kd(Kc) encrypted by the distribution key Kd, by using the distribution key Kd held in the storage module 152 (procedure 3). The identification information appending section 24 appends the identification information ID1 of the first information processing unit 100 to the contents key Kc decoded by the contents key decoding section 23 (procedure 4). The contents key encryption section 25 encrypts the contents key Kc+ID1 having the identification information ID1 appended thereto by the identification information appending section 24, by using the first save key Ks (procedure 5).

Then, in accordance with the third procedures, the encrypted contents key Ks(Kc+ID1) encrypted by the contents key encryption section 25 is saved into the mass storage unit 180 (procedure 6).

In the state where the encrypted contents data Kc(Cont) encrypted by the contents key Kc and the encrypted contents key Ks(Kc+ID1) encrypted by the first save key Ks are saved in the mass storage unit 180, by inputting operation input data, that is, user-designated information from the operation input section 230 of the receiving unit 270 of the second information processing unit 200 shown in FIG. 2 to the upper controller 220, a contents request command for requesting transfer of contents is transmitted from the second information processing unit 200 to the first information processing unit 100 (procedure 7), thus carrying out mutual authentication between the first information processing unit 100 and the second information processing unit 200 (procedure 8).

In the procedure 7, the receiving unit 270 of the second information processing unit 200 encrypts the contents request command including the contents number of the contents to be copied (transferred) from the first information processing unit 100 by using the session key and sends the encrypted contents request command to the receiving unit 170 of the first information processing unit 100. The receiving unit 170 of the first information processing unit 100, having received the contents request command, obtains the contents number by decoding the received data by the session key after completion of the mutual authentication of the procedure 8, and retrieves and takes out the encrypted contents data Kc(Cont) and encrypted contents key Ks(Kc+ID1) corresponding to the contents data from the mass storage unit 180 (procedure 9).

Subsequently, the receiving unit 170 of the first information processing unit 100 causes the contents key decoding section 23 to decode the contents key (Kc+ID1) having the identification information ID appended thereto from the encrypted contents key Ks(Kc+ID1) by using the first save key Ks in the storage module 152 (procedure 10), and causes the contents key encryption section 25 to encrypt the decoded contents key (Kc+ID1) using the second save key Ks' registered to the storage module 152 (procedure 11). Then, the receiving unit 170 transmits the encrypted contents key Ks'(Kc+ID1) which has the identification information ID1 appended thereto and is encrypted and the encrypted contents data Kc(Cont) to the receiving unit 270 of the second information processing unit 200 through the communication section 110 (procedure 12).

Subsequently, the receiving unit 270 of the second information processing unit 200 receives the encrypted contents key Ks'(Kc+ID1) and the encrypted contents data Kc(Cont) transmitted from the receiving unit 170 of the first information processing unit 100, and take them into the mass storage unit 280 (procedure 13). Then, the receiving unit 270 causes the contents key decoding section 33 to decode the contents key (Kc+ID1) having the identification information ID1 appended thereto from the received encrypted contents key Ks'(Kc+ID1) by using the second save key Ks' stored in the storage module 252 (procedure 14). The identification information need not be appended to the contents key if it is transmitted together with the contents key. The receiving unit 270 of the second information processing unit 200 can obtain the contents key Kc and the identification information ID1 of the receiving unit 170 of the first information processing unit 100 by decoding the encrypted contents key Ks'(Kc+ID1). The receiving unit 270 of the second information processing unit 200 causes the contents decoding section 34 to decode the contents data from the encrypted contents data Kc(Cont) using the contents key Kc (procedure 15).

Subsequently, in the receiving unit 270 of the second information processing unit 200, the expansion section 35 performs expansion processing on the contents data decoded by the contents decoding section 34. For example, the expansion section 35 converts the contents data to PCM data by ATRAC expansion processing (procedure 16). Then, the watermark embedding section 36 embeds the identification information ID1 proper to the first information processing unit 100 obtained by decoding the contents key (Kc+ID1) having the identification information appended thereto from the encrypted contents key Ks'(Kc+ID1) by the contents key decoding section 33, to the contents data expanded by the expansion section 35 by watermark embedding processing, and outputs the resultant data from the output terminal 37 (procedure 17).

The foregoing is the third procedures for transferring and reproducing the contents data stored in the mass storage unit 180 of the first information processing unit 100 to the second information processing unit 200.

By transferring the contents data stored in the mass storage unit 180 of the first information processing unit 100 to the second information processing unit 200 in accordance with the above-described procedures, the identification information proper to the first information processing unit 100 that purchased the contents data is embedded to the copied contents data by watermark embedding processing. Therefore, even when a malicious user tries to duplicate and sell the contents data, the identification information of the first information processing unit 100 of the user who purchased the contents data is written to the contents data, and the user who conducted illegal duplication or the like without having any contract can be traced, thus improving the crime deterrence. Also, the structures of the first information processing unit 100 and the second information processing unit 200 can be simplified to enable efficient embedding of the identification information ID1 of the first information processing unit 100 to the contents data.

In the above-described first to third procedures, the contents data and contents key received through satellite communication or through the Internet are once saved in the mass storage unit 180 of the first information processing unit 100. However, the contents data may be transferred to the second information processing unit 200 as it is in accordance with the first to third procedures.

In the encryption using the second save key Ks' before the transmission of the contents key to the second information processing unit 200, information indicating that the contents key Kc for encryption is copied (transferred) may be appended. This enables limitation of the use conditions of the contents key Kc in the second information processing unit 200, having received the contents key. For example, in the case where information indicating that copy (transfer) is not permitted is appended as the copyright information of the contents, digital output of the contents data can be stopped in the second information processing unit 200.

Moreover, though the encrypted contents data is electronically distributed through the Internet or through satellite communication in the above-described first embodiment, the encrypted contents data may also be supplied through an information recording medium such as CD-ROM.

A second embodiment of the present invention will now be described with reference to FIGS. 1, 12 and 13.

In the description of the second embodiment, the same constituent elements as those described in the first embodiment are denoted by the same numerals in the drawings and will not be described further in detail.

Figure 12:
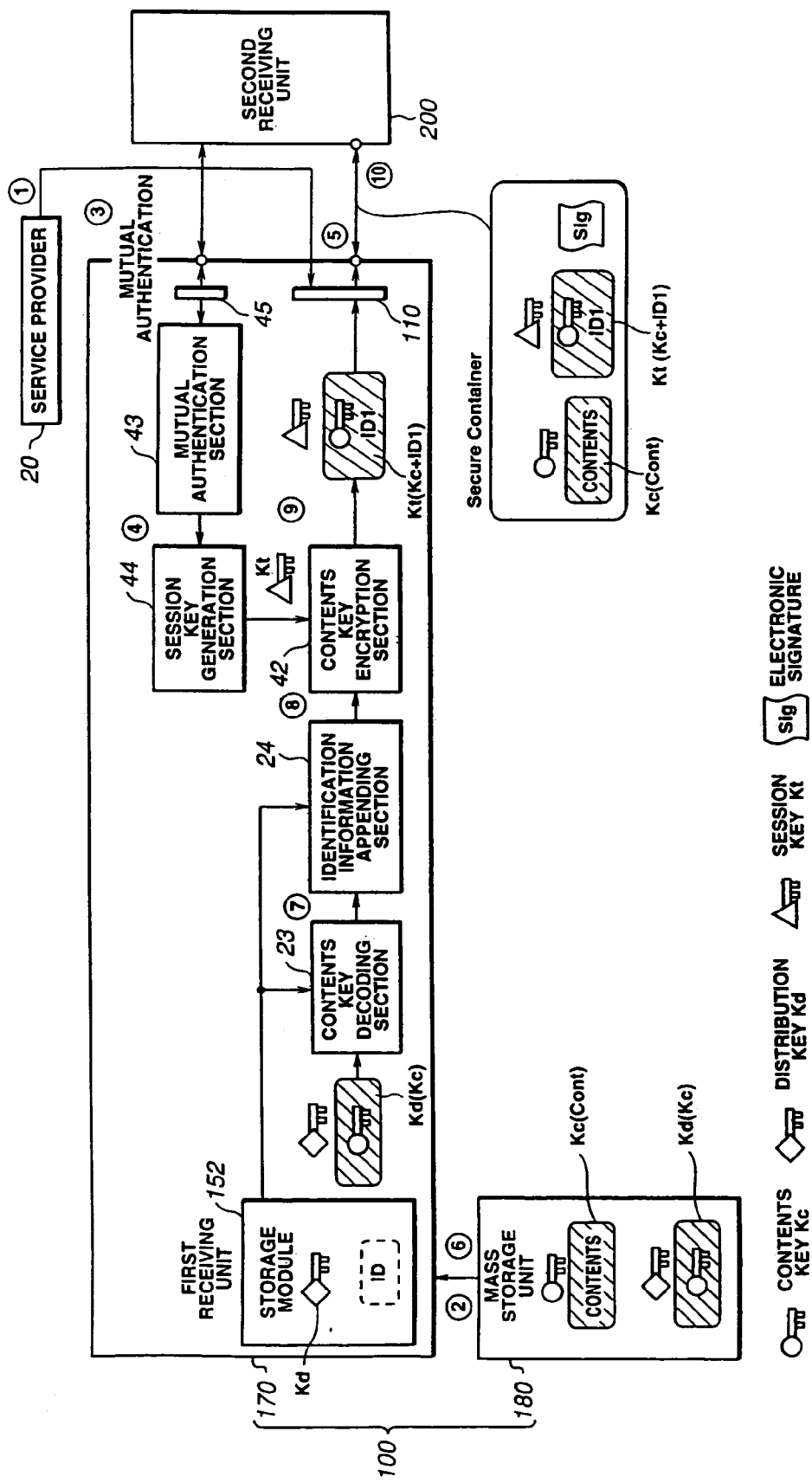
FIG. 12 is a block diagram showing the schematic structure of the receiving unit of the first information processing unit in the contents distribution system according to the second embodiment of the present invention.

In the second embodiment, the receiving unit 170 of the first information processing unit 100 has a mutual authentication section 43 for carrying out mutual authentication with the receiving unit 270 of the second information processing unit 200 through a mutual authentication interface 45, and a session key generation section 44 for generating a session key used for the mutual authentication, as the mutual authentication module 154 of the encryption processing section 150, as shown in FIG. 12. The receiving unit 170 has a contents key decoding section 23 for decoding the contents key Kc from the encrypted contents key Kd(Kc) encrypted by the distribution key Kd, an identification information appending section 24 for appending the identification information ID1 proper to the first information processing unit 100 to the decoded contents key Kc, and a contents key encryption section 42 for encrypting the contents key Kc by a session key Kt, as the encryption/decoding module 155 of the encryption processing section 150. The receiving unit 170 transmits the encrypted contents key Kt(Kc) encrypted by the contents key encryption section 42 to the second information processing unit 200 through the communication section 110. In the storage module 152 of the receiving unit 170 of the first information processing unit 100, the distribution key Kd, the first save key Ks, and the identification information ID1 proper to the first information processing unit 100 are saved. In the mass storage unit 180, the contents data Kc(Cont) encrypted by the contents key Kc and the encrypted contents key Kd(Kc) encrypted by the distribution key Kd are saved.

Figure 13:
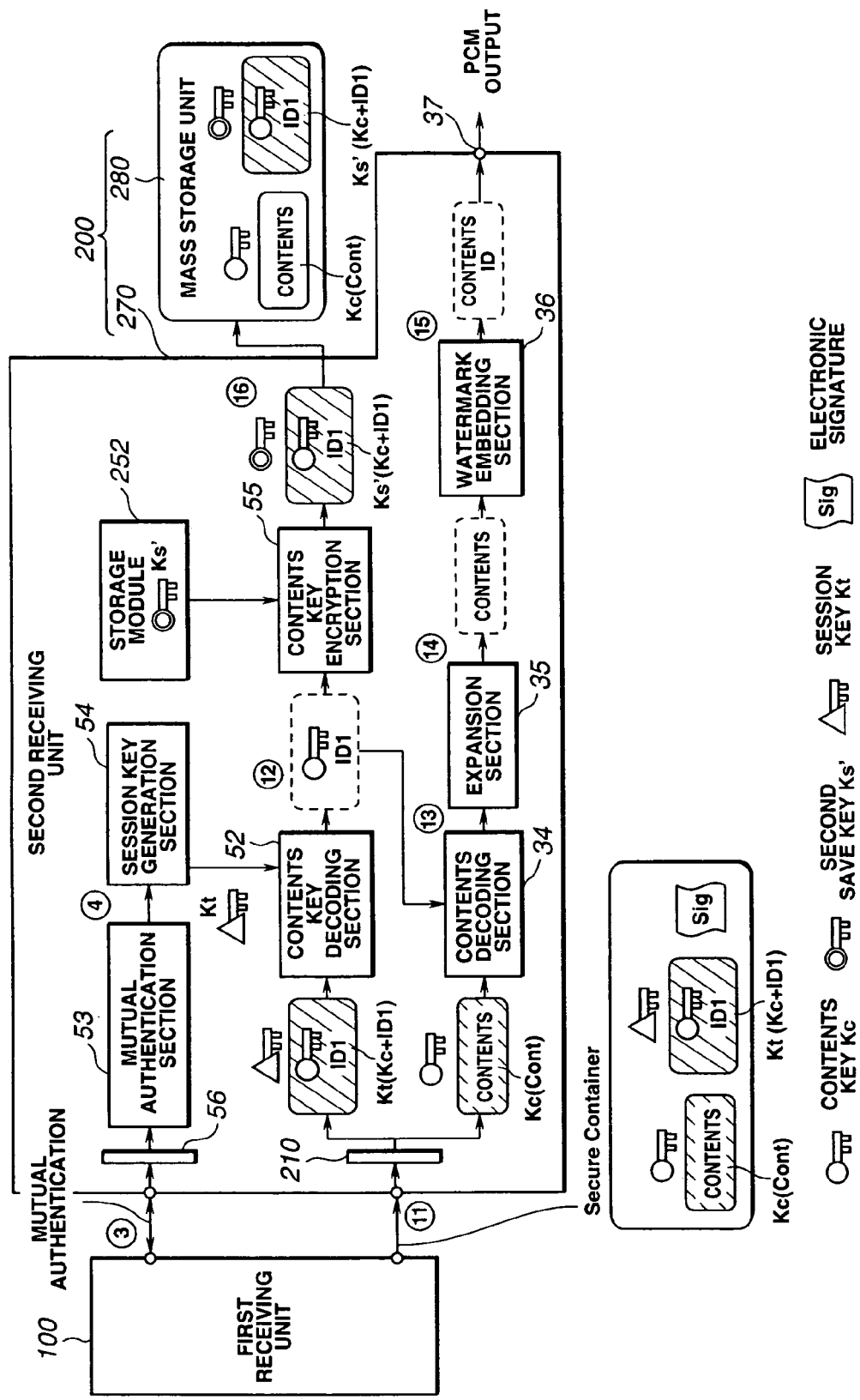
FIG. 13 is a block diagram showing the schematic structure of the receiving unit of the second information processing unit in the contents distribution system according to the second embodiment of the present invention.

The receiving unit 270 of the second information processing unit 200 has a mutual authentication section 53 for carrying out mutual authentication with the receiving unit 170 of the first information processing unit 100 through a mutual authentication interface 56, and a session key generation section 54 for generating a session key Kt used for encryption after the mutual authentication, as the mutual authentication module of the encryption processing section 250, as shown in FIG. 13. Also, the receiving unit 270 has a contents key decoding section 52 for decoding the encrypted contents key Kt(Kc) encrypted by the session key Kt, and a contents key encryption section 55 for encrypting the decoded contents key Kc by the second save key Ks' uniquely held by the second information processing unit 200 and saving the encrypted contents key to the mass storage unit 280. The receiving unit 270 of the second information processing unit 200 also has a contents decoding section 34 for decoding the contents data from the encrypted contents data Kc(Cont) encrypted by the contents key Kc, an expansion section 35 for expanding the contents data decoded by the contents decoding section 34, and a watermark embedding section 36 for embedding the identification information ID1 proper to the first information processing unit 100 to the contents data expanded by the expansion section 35 by watermark embedding processing, as the decoding module and the watermark embedding module in the contents processing section 260. The receiving unit 270 outputs the contents data to which the identification information ID1 is embedded by the watermark embedding section 36, from an output terminal 37.

In the second embodiment, the first information processing unit 100 causes the receiving unit 170 to receive the encrypted contents data Kc(Cont) encrypted by the contents key Kc sent from the service provider 20 through satellite communication or through the Internet and the encrypted contents key Kd(Kc) encrypted by the distribution key Kd (procedure 1), and saves the received encrypted contents data Kc(Cont) and encrypted contents key Kd(Kc) to the mass storage unit 180 (procedure 2).

In transferring(copying) the encrypted contents data Kc(Cont) from the first information processing unit 100 to the second information processing unit 200, the mutual authentication is carried out between the mutual authentication section 43 of the receiving unit 170 of the first information processing unit 100 and the mutual authentication section 53 of the receiving unit 270 of the second information processing unit 200, by inputting operation input data, that is, user-designated information from the operation input section 230 of the receiving unit 270 of the second information processing unit 200 shown in FIG. 2 to the upper controller 220 (procedure 3). In this case, the session key Kt is generated and shared by the session key generation section 44 of the receiving unit 170 of the first information processing unit 100 and the session key generation section 45 of the receiving unit 270 of the second information processing unit 200 (procedure 4).

Subsequently, the receiving unit 270 of the second information processing unit 200 encrypts by the session key Kt a contents request command including the contents number of the contents data to be copied from the receiving unit 170 of the first information processing unit 100, and sends the encrypted contents request command to the receiving unit 170 of the first information processing unit 100 (procedure 5).

The receiving unit 170 of the first information processing unit 100, having received the contents request command, decodes the received data by the session key Kt so as to obtain the contents number. Then, the receiving unit 170 retrieves and takes out the encrypted contents data Kc(Cont) and encrypted contents key Kd(Kc) corresponding to the contents number from the mass storage unit 180 of the first information processing unit 100 (procedure 6).

Subsequently, the receiving unit 170 of the first information processing unit 100 causes the contents key decoding section 23 to decode the contents key Kc from the encrypted contents key Kd(Kc) by the distribution key Kd held in the storage module 152 (procedure 7), and causes the identification information appending section 24 to append its own identification information ID1 to the decoded contents key Kc (procedure 8).

Subsequently, the receiving unit 170 of the first information processing unit 100 causes the contents key encryption section 42 to encrypt the contents key (Kc+ID1) having its own identification information ID1 appended thereto, by using the session key Kt (procedure 9). Then, the receiving unit 170 transmits these encrypted contents key Kt(Kc+ID1) and encrypted contents data Kc(Cont) to the receiving unit 170 of the second information processing unit 200 through the communication section 110 (procedure 10).

The receiving unit 270 of the second information processing unit 200 receives, through the communication section 210, the encrypted contents key Kt(Kc+ID1) encrypted by the session key Kt and the encrypted contents data Kc(Cont) encrypted by the contents key Kc, transmitted from the receiving unit 170 of the first information processing unit 100 (procedure 11). The receiving unit 270 of the second information processing unit 200 causes the contents key decoding section 52 to decode the received encrypted contents key Kt(Kc+ID1) using the session key Kt generated by the session key generation section 54 (procedure 12).

The receiving unit 270 of the second information processing unit 200 can obtain the contents key Kc and the identification information ID1 of the first information processing unit 100 by decoding the contents key (Kc+ID1) having the identification information appended thereto from the encrypted contents key Kt(Kc+ID1). The receiving unit 270 of the second information processing unit 200 causes the contents decoding section 34 to decode the contents data Cont from the encrypted contents data Kc(Cont) using the contents key Kc (procedure 13). Then, the expansion section 35 performs ATRAC expansion processing or the like on the contents data decoded by the contents decoding section 34 (procedure 14). Then, the watermark embedding section 36 embeds the identification information ID1 proper to the first information processing unit 100 obtained by causing the contents key decoding section 33 to decode the contents key (Kc+ID1) having the identification information appended thereto from the contents key Kt(Kc+ID1), to the contents data Cont decoded by the contents decoding section 34 by watermark embedding processing, and outputs the resultant data through the output terminal 37 (procedure 15).

Also, the receiving unit 270 of the second information processing unit 200 causes the contents key encryption section 55 to encrypt the contents key Kc decoded by the contents key decoding section 52, by using the second save key Ks' stored in the storage module 252. Then, the receiving unit 270 stores the encrypted contents key Ks'(Kc) encrypted by the second save key Ks' to the mass storage unit 280 (procedure 16).

By transferring the contents data stored in the mass storage unit 180 of the first information processing unit 100 to the second information processing unit 200 in accordance with the above-described procedures, the identification information ID1 proper to the first information processing unit 100 that purchased the contents data is embedded to the transferred contents data by watermark embedding processing. Therefore, even when a malicious user tries to duplicate and sell the contents data, the identification information of the user who purchased the contents data is written to the contents data, and the user who conducted illegal duplication or the like without having any contract can be traced, thus improving the crime deterrence. Also, the structures of the first information processing unit 100 and the second information processing unit 200 can be simplified to enable efficient embedding of the identification information ID1 of the first information processing unit 100 to the contents data. In addition, particularly in the second embodiment, since it is not necessary to transmit and supply the second save key Ks' of the second information processing unit 200 to the first information processing unit 100, the safety is further improved.

A third embodiment of the present invention will now be described with reference to FIGS. 1, 2, 14 and 15.

Figure 14:
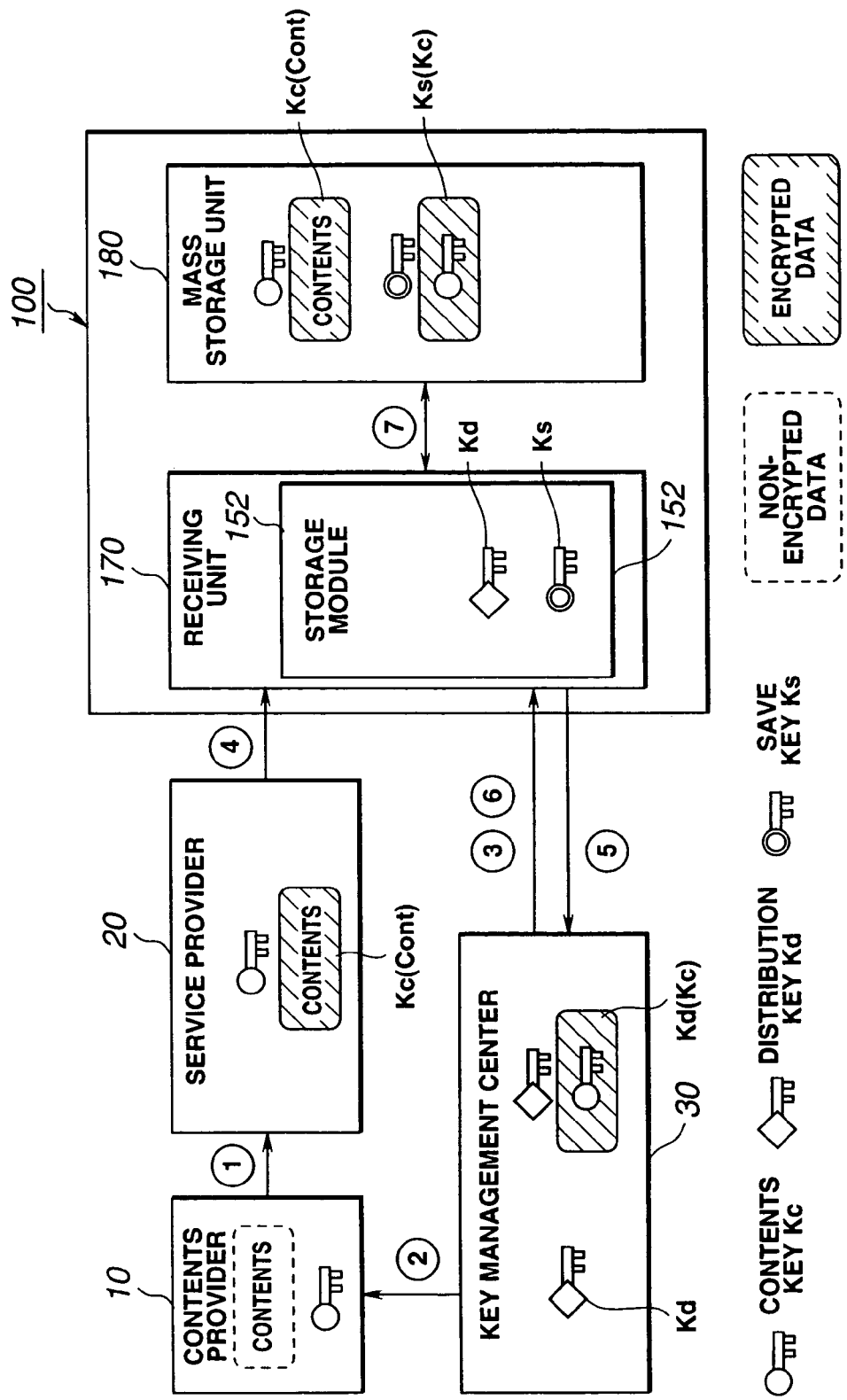
FIG. 14 is a block diagram showing the schematic structure of the receiving unit of the first information processing unit in the contents distribution system according to the third embodiment of the present invention.
Figure 15:
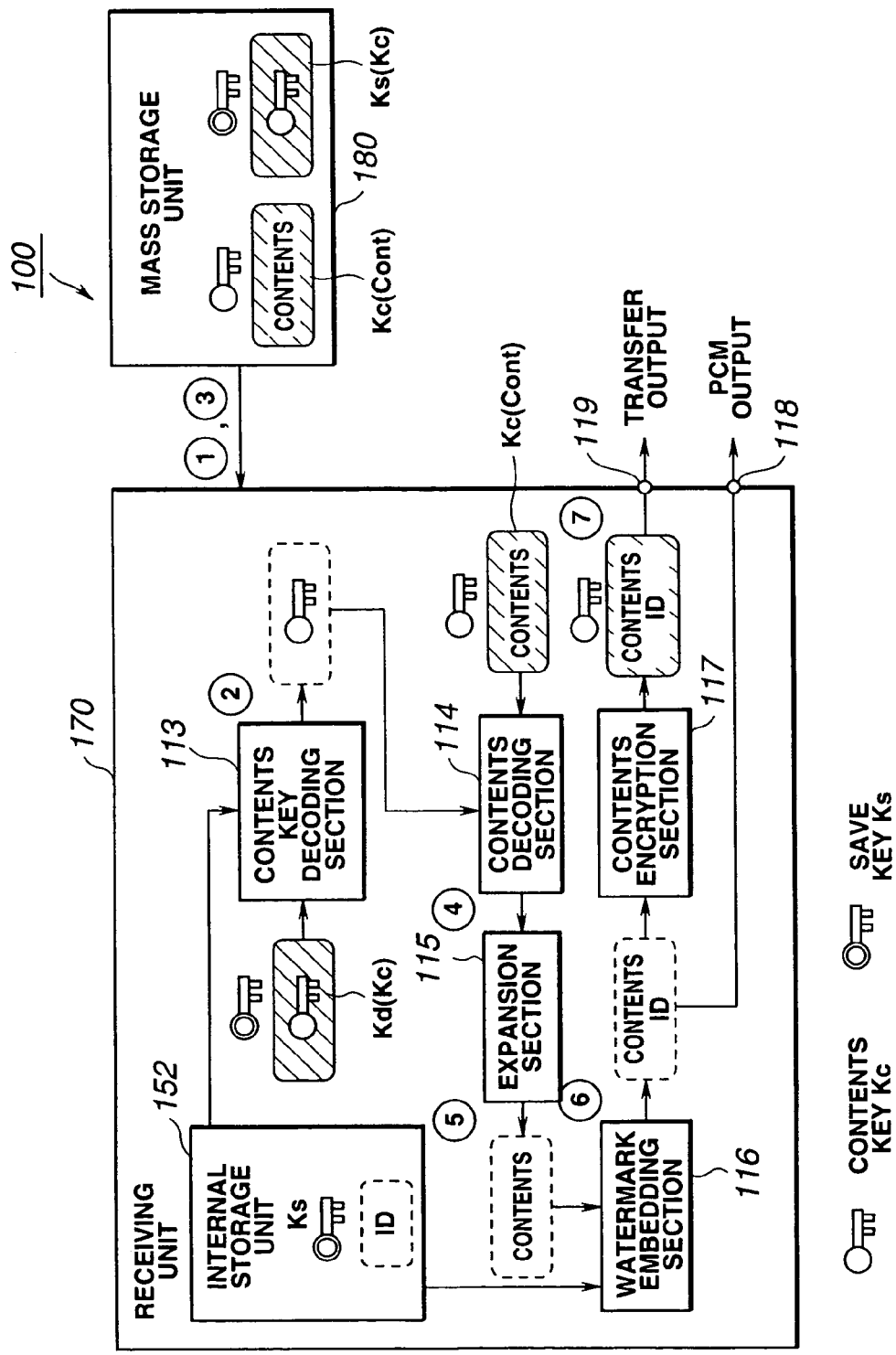
FIG. 15 is a block diagram showing the schematic structure of the receiving unit of the second information processing unit in the contents distribution system according to the third embodiment of the present invention.

In the third embodiment, the contents provider 10, which holds non-encrypted contents (e.g., music data, image data, text data such as books, still image data, etc.), encrypts the contents data (Cont) by the contents key Kc held or generated by the provider itself, and supplies the encrypted contents data to the service provider 20, as shown in FIG. 14 (procedure 1). The contents provider 10 supplies the contents key Kc to the key management center 30 (procedure 2). This contents key Kc may be different from contents to contents or may be the same.

The key management center 30 encrypts the contents key Kc by its own distribution key (which may be different for each receiving unit 170 of the user or may be common to all the receiving units) Kd, and supplies the encrypted contents key Kd(Kc) encrypted by the distribution key Kd to the receiving unit 170 of the user in response to the request from the receiving unit 170 of the user (procedure 3).

The receiving unit 170 of the information processing unit 100 of the user receives the encrypted contents data Kc(Cont) encrypted by the contents key Kc from the service provider 20 through satellite communication, cable communication or the Internet (procedure 4). The receiving unit 170, having received the encrypted contents data Kc(Cont), requests the contents key Kc for decoding from the key management center 30 in order to decrypt the data (procedure 5). On receiving the request for transmission of the contents key Kc, the key management center 30 transmits the encrypted contents key Kd(Kc) encrypted by the distribution key Kd to the information processing unit 100 of the user (procedure 6). At this point, the key management center 30 simultaneously carries out accounting processing. This accounting processing may be carried out by drawing the fee from the bank account of the user registered to the key management center 30 or by having the credit card number sent from the receiving unit 170 of the user and then charging the fee in accordance with this card number. Alternatively, the necessary fee may be drawn from the prepaid amount accumulated on the IC card provided in the receiving unit 170 of the information processing unit 100.

The receiving unit 170 of the information processing unit 100 of the user, having received the encrypted contents key Kd(Kc), decodes the contents key Kc from the encrypted contents key Kd(Kc) using the distribution key Kd held in the storage module 152, and thus can decode the encrypted contents using the decoded contents key Kc.

The receiving unit 170 of the information processing unit 100 encrypts the decoded contents key Kc by its unique save key Ks and saves the encrypted contents key to the mass storage unit 180 (procedure 7). This is because the distribution key Kd used for distributing the contents key Kc may be changed every predetermined period. Also, saving the contents key Kc without encryption is essential the same as saving the contents without encryption, and there is a possibility that a third party can freely see the contents. Also, by encrypting the contents key Kc by its own save key Ks, the receiving unit 170 of the user can use the contents without having the fee charged again in decoding the same contents.

The procedures for decoding the encrypted contents data Ks(Cont) encrypted by the save key Ks and for transferring the decoded contents data to another equipment by the information processing unit 100 of the user will now be described.

In the mass storage unit 180 of the receiving unit 170 of the information processing unit 100, the encrypted contents data Kc(Cont) and, the encrypted contents key Ks(Kc) are saved. In the storage module 152 provided inside the receiving unit 170, the save key Ks and the identification information (ID) of this receiving unit 170 are saved.

In the case where the contents data is to be decoded from the encrypted contents data Kc(Cont) in the mass storage unit 180 and transferred to another equipment, the receiving unit 170 of the information processing unit 100 first reads out the encrypted contents key Ks(Kc) from the mass storage unit 180 (procedure 1), and causes a contents key decoding section 113 to decode the usable contents key Ks from the encrypted contents key Ks(Kc) using the save key Ks read out from the storage module 152 (procedure 2). Next, the receiving unit 170 reads out the encrypted contents data Kc(Cont) from the mass storage unit 180 (procedure 3), causes a contents decoding section 114 to decode the contents data from the encrypted contents data Kc(Cont) using the contents key Kc (procedure 4), causes an expansion section 116 to expand the decoded contents data to PCM data by ATRAC processing (procedure 5), and then causes a watermark embedding section 115 to embed the identification information proper to the receiving unit 170 to the expanded contents data and to output the resultant data through an output terminal 118 (procedure 6).

In the case where this contents data is to be transferred to another device, the receiving unit 170 causes a contents encryption section 117 to encrypt the contents data by the same contents key Kc and outputs the encrypted contents data Kc(Cont) through an output terminal 119 (procedure 7).

Thus, the identification information proper to the receiving unit 170 in the information processing unit 100 of the user who purchased the contents is embedded by watermark embedding processing to the contents data transferred from the receiving unit 170 to an external device. Therefore, even when a malicious user tries to duplicate and sell the contents data, the identification information of the user who purchased the contents is written to the contents data, and the user who conducted illegal duplication or the like can be traced, thus improving the crime deterrence.

The invention claimed is:

1. A contents signal receiving device comprising:
   receiving means for receiving a contents signal from a first device, the contents signal being encrypted by a first key, and for receiving the first key from the first device, the first key being encrypted by a second key;
   storage means for storing the encrypted contents signal received by the receiving means;
   decoding means for decoding the encrypted contents signal stored in the storage means when an instruction to decode the encrypted contents signal stored in the storage means is given as user-designated information;
   identification information appending means for appending identification information to the contents signal decoded by the decoding means;
   transmission means for transmitting the first key encrypted by the second key to a second device that decrypts the first key; and
   decrypting means;
   wherein the receiving means receives the first key from the second device, the second device having encrypted the first key with a third key, and wherein the decrypting means decrypts the first key encrypted with the third key.

2. The contents signal receiving device as claimed in claim 1, wherein the identification information is the identification information proper to the contents signal receiving device.

3. The contents signal receiving device as claimed in claim 1, wherein the identification information is embedded to the contents signal as a watermark.

4. The contents signal receiving device according to claim 1, further comprising a log information generating means for generating log information when the first key is decrypted by the decrypting means.

5. The contents signal receiving device according to claim 4, further comprising a storage means for storing the log information and for storing the first key.

6. A contents signal receiving method by a third device, the method comprising the steps of:
   receiving a contents signal from a first device, the contents signal being encrypted by a first key;
   receiving the first key from the first device, the first key being encrypted by a second key;
   storing the received encrypted contents signal;
   decoding the stored encrypted contents signal when an instruction to decode the stored encrypted contents signal is given as user-designated information;
   appending identification information to the decoded contents signal;
   transmitting the first key encrypted by the second key to a second device that decrypts the first key;
   receiving the first key from the second device, the second device having encrypted the first key with a third key; and
   decrypting the first key encrypted with the third key, the decrypting being done by the third device.

7. The contents signal receiving method as claimed in claim 6, wherein the identification information is the identification information proper to a contents signal receiving device.

8. The contents signal receiving method as claimed in claim 6, wherein the identification information is embedded to the contents signal as a watermark.

9. The contents signal receiving method according to claim 6, further comprising the step of generating log information when the first key is decrypted by the decrypting means.

10. The contents signal receiving method according to claim 9, further comprising the step of storing the log information and storing the first key.

* * * * *